(12) United States Patent
Tran

(10) Patent No.: US 6,262,679 B1
(45) Date of Patent: Jul. 17, 2001

(54) MIDAIR COLLISION AVOIDANCE SYSTEM

(75) Inventor: My Tran, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/538,804

(22) Filed: Mar. 30, 2000

Related U.S. Application Data
(60) Provisional application No. 60/128,655, filed on Apr. 8, 1999.

(51) Int. Cl.$^7$ .................................................. G01S 13/93
(52) U.S. Cl. .............................. 342/29; 342/30; 342/36; 342/46; 342/49
(58) Field of Search ................. 342/29, 30, 32, 342/36, 37, 38, 42, 43, 46, 49, 50, 57

(56) References Cited

U.S. PATENT DOCUMENTS

| | | | |
|---|---|---|---|
| 4,763,861 | 8/1988 | Newman | 244/134 |
| 5,459,469 | * 10/1995 | Schuchman et al. | 342/37 |
| 5,548,839 | * 8/1996 | Caldwell et al. | 455/313 |
| 5,570,095 | * 10/1996 | Drouilhet et al. | 342/357.07 |
| 5,627,546 | * 5/1997 | Crow | 342/352 |
| 5,691,723 | * 11/1997 | King et al. | 341/178 |
| 5,798,726 | * 8/1998 | Schuhman et al. | 342/37 |
| 5,805,111 | 9/1998 | Brettner, III et al. | 342/455 |
| 5,835,059 | * 11/1998 | Nadel et al. | 342/398 |
| 5,867,804 | * 2/1999 | Pilley et al. | 701/120 |
| 5,929,783 | * 7/1999 | King et al. | 340/870.05 |
| 6,006,158 | * 12/1999 | Pilley et al. | 701/120 |
| 6,072,994 | * 6/2000 | Phillips et al. | 455/84 |
| 6,169,770 | * 1/2001 | Henely | 375/317 |
| 6,182,005 | * 1/2001 | Pilley et al. | 701/120 |

FOREIGN PATENT DOCUMENTS

| | | | |
|---|---|---|---|
| 200022026 | * 7/2000 | (AU) . | |
| WO 97/078839 | 3/1997 | (WO) | H04B/1/04 |

OTHER PUBLICATIONS

Happel, Donald A.; "Proposed Avionics Architecture For Air Fore Air Modility Command Aircraft To meet CNS/ATM and GATM Requirements"; 1998; vol. 2, p. F16–1–F16–9 XP–002135816 Section "Surveillance/Safety Subsystem", p. F16–9*.

* cited by examiner

Primary Examiner—John B.j Sotomayor
(74) Attorney, Agent, or Firm—Loria B. Yeadon

(57) ABSTRACT

A midair collision avoidance system (MCAS) employs an existing design of Traffic Alert and Collision Avoidance System (TCAS) as a module and seamlessly integrates it with a customized tactical module which is capable of providing unique tactical avoidance guidance control and display. The tactical module handles all phases of a tactical mission, including formation flight (e.g., formation fall-in, arming formation flight, engaging formation flight following, and formation break-away), and an air-refueling sequence (e.g., rendezvous, linkup, re-fueling, and disengaging air-refueling). The tactical module divides the air space around the aircraft into advisory, caution, and warning zones and for each provides display, tone and voice alerts to facilitate pop-up avoidance guidance commands. Military aircraft can thus effectively avoid mid air and near mid air collision situations in all three different operation modes: air traffic control (ATC) management mode, tactical mode, and a mixed mode.

26 Claims, 17 Drawing Sheets

MIDAIR COLLISION AVOIDANCE SYSTEM

I. CROSS-REFERENCE TO RELATED APPLICATIONS

This application claims priority to provisional application, Ser. No. 60/128,655, filed Apr. 8, 1999.

II. BACKGROUND OF THE INVENTION

The present invention relates generally to the field of avionics for airborne collision avoidance systems (CAS).

Spurred by the collision of two airliners over the Grand Canyon in 1956, the airlines initiated a study of collision avoidance concepts. By the late 1980's, a system for airborne collision avoidance was developed with the cooperation of the airlines, the aviation industry, and the Federal Aviation Administration (FAA). The system, referred to as Traffic Alert and Collision Avoidance System II (TCAS II) was mandated by Congress to be installed on most commercial aircraft by the early 1990's. A chronology of the development of airborne collision avoidance systems can be found in "Introduction to TCAS II," printed by the Federal Aviation Administration of the U.S. Department of Transportation, March 1990.

The development of an effective airborne CAS has been the goal of the aviation community for many years. Airborne collision avoidance systems provide protection from collisions with other aircraft and are independent of ground based air traffic control. As is well appreciated in the aviation industry, avoiding such collisions with other aircraft is a very important endeavor. Furthermore, collision avoidance is a problem for both military and commercial aircraft alike. In addition, a large, simultaneous number of TCAS interrogations from close-in formation aircraft members generate significant radio frequency (RF) interference and could potentially degrade the effectiveness of maintaining precise position/separation criteria with respect to other aircraft and obstacles. Therefore, to promote the safety of air travel, systems that avoid collision with other aircraft are highly desirable.

Referring to FIG. 1, there is shown a block diagram of a conventional TCAS system. Shown in FIG. 1 are TCAS directional antenna 10, TCAS omni-directional antenna 11, and TCAS computer unit 12, which includes receiver 12A, transmitter 12B, and processor 12C. Also shown are aural annunciator 13, traffic advisory (TA) display 14, and resolution advisory (RA) displays 15. Alternatively, the TA and RA displays are combined into one display (not shown). The transponder is comprised of transponder unit 16A, control panel 16B, and transponder antennas 16C and 16D. The TCAS and transponder operate together to function as a collision avoidance system. Those skilled in the art understand that this is merely illustrative of a conventional TCAS. For example, many other configurations are possible such as replacing omni-directional antenna 11 with a directional antenna as is known to those skilled in the art. The operation of TCAS and its various components are well known to those skilled in the art and are not necessary for understanding the present invention.

In a TCAS system, both the interrogator and transponder are airborne and provide a means for communication between aircraft. The transponder responds to the query by transmitting a reply that is received and processed by the interrogator. Generally, the interrogator includes a receiver, an analog to digital converter (A/D), a video quantizer, a leading edge detector, and a decoder. The reply received by the interrogator includes a series of information pulses that may identify the aircraft, or contain altitude or other information. The reply is a pulse position modulated (PPM) signal that is transmitted in either an Air Traffic Control Radar Beacon System (ATCRBS) format or in a Mode-Select (Mode-S) format. Other replies are possible as is known to those skilled in the art.

A TCAS II equipped aircraft can monitor other aircraft within approximately a 20-mile radius of the TCAS II equipped aircraft. (see, e.g., Brettner et al., U.S. Pat. No. 5,805,111, Method and Apparatus for Accomplishing Extended Range TCAS, which describes an extended range TCAS.) When an intruding aircraft is determined to be a threat, the TCAS II system alerts the pilot to the danger and gives the pilot bearing and distance to the intruding aircraft. If the threat is not resolved and a collision or near miss is probable, then the TCAS II system advises the pilot to take evasive action by, for example, climbing or descending to avoid a collision.

The TCAS II system, which is currently in operation on many commercial and military aircraft, is very effective in providing midair collision avoidance in civil Air Traffic Control (ATC) airspace in determining the range, altitude, and bearing with other aircraft equipped with Mode S/ATCRBS transponders. It monitors the trajectory of these aircraft for the purpose of determining if any of them constitute a potential collision hazard. The system is responsible for estimating the projected intruder track and determining if a potential conflict exists. If a conflict is detected, the system displays an advisory to the pilot. The system also provides guidance for vertical avoidance maneuver, known as Resolution Advisories (RAs). Complementary avoidance maneuvers between two TCAS equipped aircraft are ensured by automatic coordination of mutual intentions with the other aircraft through the Mode S transponders and associated TCAS.

However, the TCAS II (or other TCAS units) originally was not designed to handle unique mission capabilities, which would be required, for example, by military aircraft. Examples of such unique mission capabilities are: operate in a tactical environment (tactical speed and dynamic maneuvers), perform highly dynamic, close-in formation flight, rendezvous, and air refueling. At the same time, the system must effectively detect and avoid midair collision situation.

III. SUMMARY OF THE INVENTION

The present invention comprises a hybrid midair collision avoidance system (MCAS), which can provide a comprehensive solution for mid air collision avoidance and unique mission capabilities to perform formation flight, rendezvous, and air re-fueling. An aircraft equipped with this MCAS can operate in many different environment modes, from a regulated air traffic management (ATM) airspace to a tactical air space of battlefield, or a peripheral airspace having both ATM operational and tactical operational attributes.

The ATM module contains many existing core TCAS II functions, which can provide traffic advisory (TA) and resolution advisory (RA) capabilities for an aircraft to handle collision avoidance situation in the ATC airspace or environment. The ATM module is based on the latest TCAS II system or equivalent which currently complies with the Federal Aviation Administration (FAA) Technical Standard Order (TSO)-C119a. The ATM module is easily upgradeable to incorporate any new requirement changes in order to be compliant with future ATM requirements.

To minimize the certification process for commercial TCAS related functions and to address specifically the operational capabilities of aircraft, such as those used by the military aircraft, all of the missionized capabilities required to operate in a tactical environment are allocated to the Tactical module. The tactical module works in conjunction with the ATM module to provide the following mission attributes: quick-time response, resistant to jamming and interference, and minimized detection beyond a short distance (e.g., 10 miles or less). The primary function of the Tactical module is to provide tactical traffic alerts, tactical collision avoidance resolutions, display and control guidance to support unique mission capabilities such as formation flight, rendezvous, and air refueling in a highly dynamic environment.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

IV. BRIEF DESCRIPTION OF THE DRAWINGS

The accompanying figures further illustrate the present invention and, together with the detailed description of the invention, serve to explain the principles of the present invention.

V. DETAILED DESCRIPTION OF THE INVENTION

Figure 1:
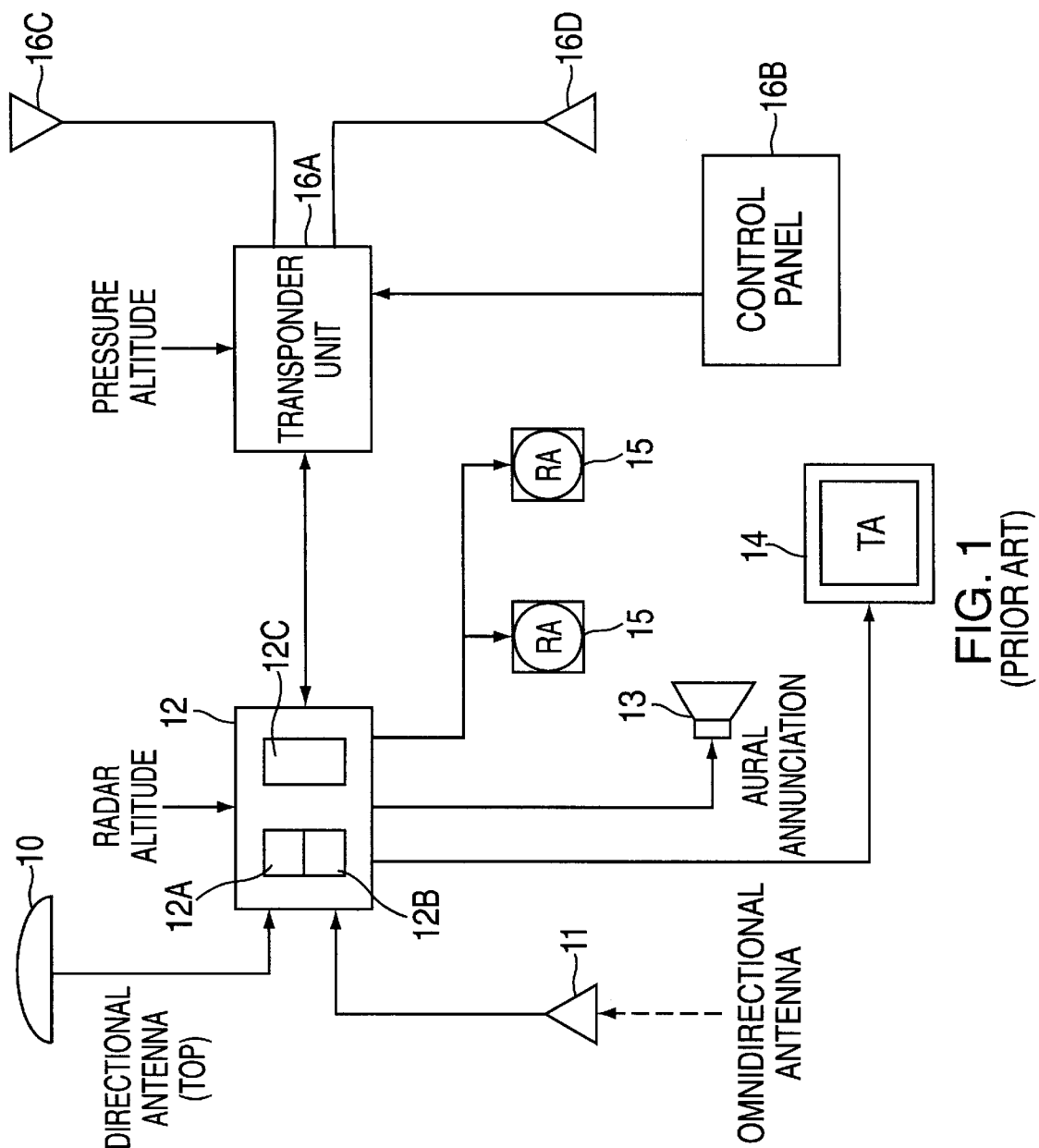
FIG. 1 is a block diagram of a conventional TCAS.
Figure 2:
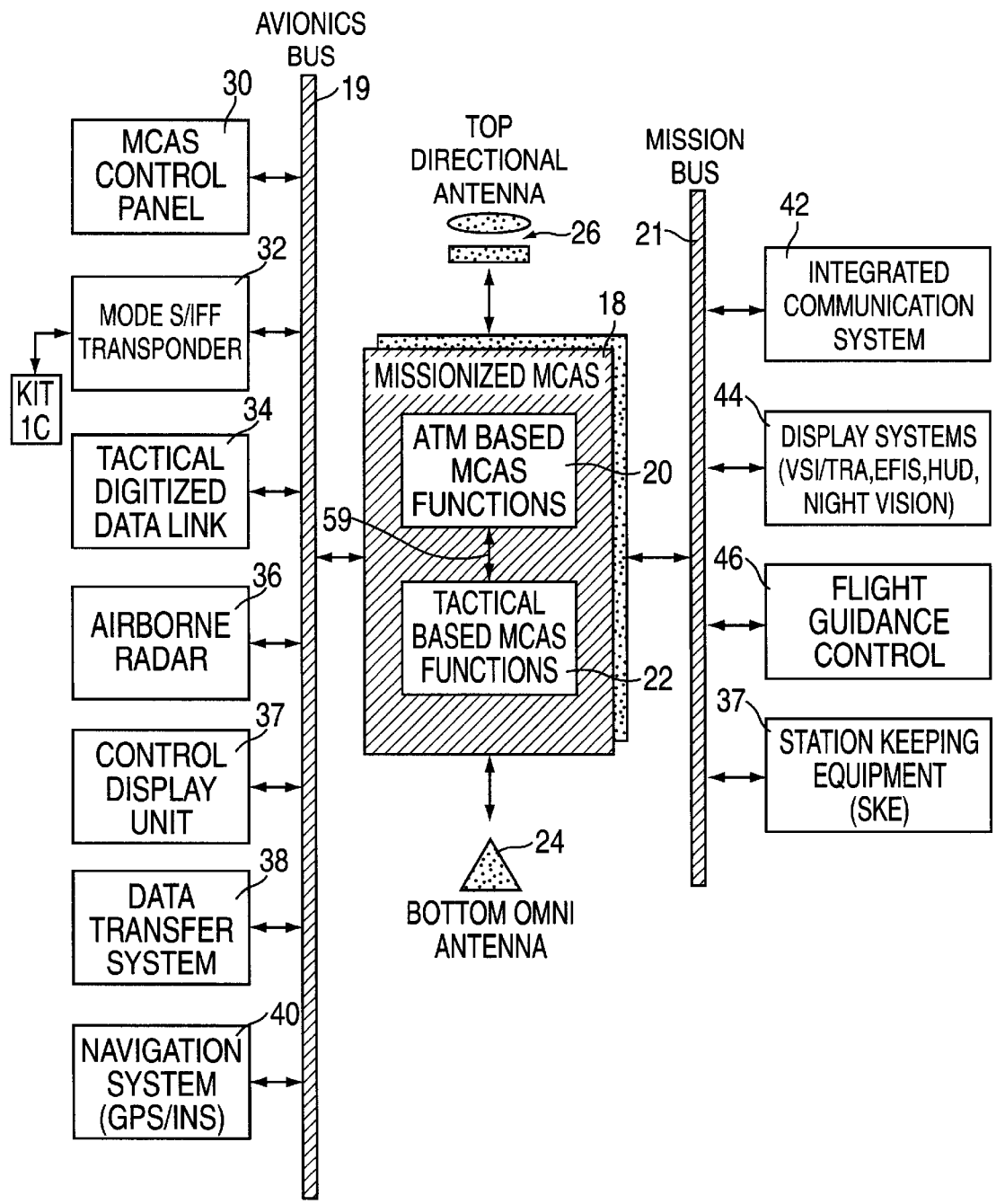
FIG. 2 is a block diagram of the midair collision avoidance system and its interfaces with other avionics systems and mission equipment on board an aircraft in accordance with the present invention.

Referring to FIG. 2, there is shown a modularized structure diagram of the midair collision and avoidance system 18 along with other aircraft system. Typically, a military aircraft contains a number of avionics system connected to some kind of avionics bus 19 and mission equipment connected to some kind of mission bus 21. In conjunction with the midair collision avoidance system (MCAS) 18, FIG. 2 shows a MCAS control panel 30, a mode S/IFF (identification of friend or foe) transponder system 32, digitized tactical data link system 34, airborne radar system 36, control display unit (CDU) 37, station keeping equipment (SKE) 37, data transfer system (DTS) 38 which provides a digital terrain elevation database, navigation system 40 comprised of an inertial navigation subsystem (INS), a global position subsystem (GPS), an integrated communication system (ICS) 42, display systems 44 (e.g., VSI/TRA, EFIS, MFD, a head up display (HUD)), and a flight guidance control system 46. While these systems are exemplary of those attached to a typical avionics bus 19 and mission bus 21, it will be understood that numerous other systems can be and typically are connected. Avionics bus 19 allows all of the avionics on the bus to share information and communicate with one another. Mission bus 21 allows all of the mission equipment on the bus to share information and communicate with one another. A typical example of avionics 19 bus is an ARINC bus used in commercial or modified commercial of the shell (COTS) applications. A typical example of a mission bus 21 is a MIL-STD-1553 bus used in military applications.

Midair collision avoidance system 18 provides conventional traffic advisories, collision avoidance resolutions when the aircraft operates in an air traffic control (ATC) environment (ATM mode). In the mixed mode, MCAS 18 provides display for tactical advisories, cautions, and warning situations and responsive control guidance to match with a fast operational tempo and the dynamics of the environment. In the tactical mode, MCAS 18 provides unique mission capabilities to allow a military aircraft to perform formation flight following, to rendezvous with other aircraft, and to dock with a tanker for air-refueling and avoid collision with other electronically-coordinated aircraft. The system's two functional modules, ATM 20 and Tactical module 22 shown in FIG. 2, perform specific MCAS functions based on system mode in operation and which is determined by a set of parameters including operational environment, digital data link capability, preset and manual input data, and MCAS mode selection.

When the aircraft is operating in an ATM mode (pure ATM environment), then MCAS 18 is an onboard advisory system designed to act as a backup to the air traffic control (ATC) radar and the "see and avoid" principle. The system has a surveillance envelope defined by a horizontal radius of approximately 40 nautical miles and an unlimited vertical range. The system continually surveys the airspace around the aircraft, seeking replies from other aircraft ATC transponders. The ATM module 20 manages the replies of the transponder 32. Currently, flight paths are predicted based on their tracks. Flight paths predicted to penetrate a potential collision airspace surrounding the MCAS 18 aircraft are annunciated by MCAS. The ATM module 20 generates two types of annunciations: Traffic Advisory (TA) and Resolution Advisory (RA).

When the aircraft is operating in a tactical mode, MCAS 18 activates the functions embedded in the Tactical module 22 to identify coordinated tactical aircraft, provide display and voice indicative of tactical advisory, caution, warning, and generate control and guidance commands for the flight guidance system 46. An aircraft is defined as a coordinated aircraft if it is a formation leader, formation sub-leader, or a tanker. The preferred system processes pilot commands and activates dedicated processes in the tactical module 22 to accommodate unique mission capabilities needed by an aircraft for example, in a formation flight or an air re-fueling. Each dedicated process performs a complete set or subset of functions depending on the role of the aircraft in a formation flight or an air re-fuelling mission. The aircraft can be either a formation leader, a formation sub-leader, a wingman, a tanker, or an air refueller.

When the aircraft is operating in a mixed mode (ATM and tactical), MCAS 18 is not only an onboard advisory system, but also a mission control guidance and display system. If the aircraft operates in a mixed mode, the MCAS 18 will have to process collision avoidance solutions (CAS) in parallel with tactical solutions. The MCAS 18 distributes intruder air traffic tracking to different modules in order to generate appropriate TAs and RAs for tactical, coordinated tactical, unknown, and non-tactical aircraft. If an intruder aircraft is a commercial aircraft, then the ATM module 20 will provide TAs and RAs according to the Air Traffic Management (ATM) rules. Conversely, if an intruder aircraft is any tactical aircraft type, then the tactical module 22 will use a tactical model (e.g., FIG. 9) with specific timing constraints to produce advisories, cautions, warning displays, audio tones and voice, and to process applicable control and avoidance guidance control laws for commands. The audio tone will be modulated with varied frequency to indicate the dangerous levels of proximity range and closure rate with an intruder aircraft. Voice messages are also provided to request immediate, specific pilot actions such as "CLIMB-CLIMB-CLIMB", "DESCEND-DESCEND-DESCEND", "INCREASE CLIMB", "TURN LEFT", "ROLL OUT", "TURN RIGHT", "REDUCE DESCENT-REDUCE DESCENT", and other voice messages to respond to the current air traffic and collision situation. The tactical module 22 also controls radio frequency (RF) transmission power level, manages the frequency of data transmission, and places transmission source (e.g., transponder, VHF/UHF radios) in a standby mode based on the system mode, the aircraft's role in a mission, and the pilot's manual selection.

Figure 3:
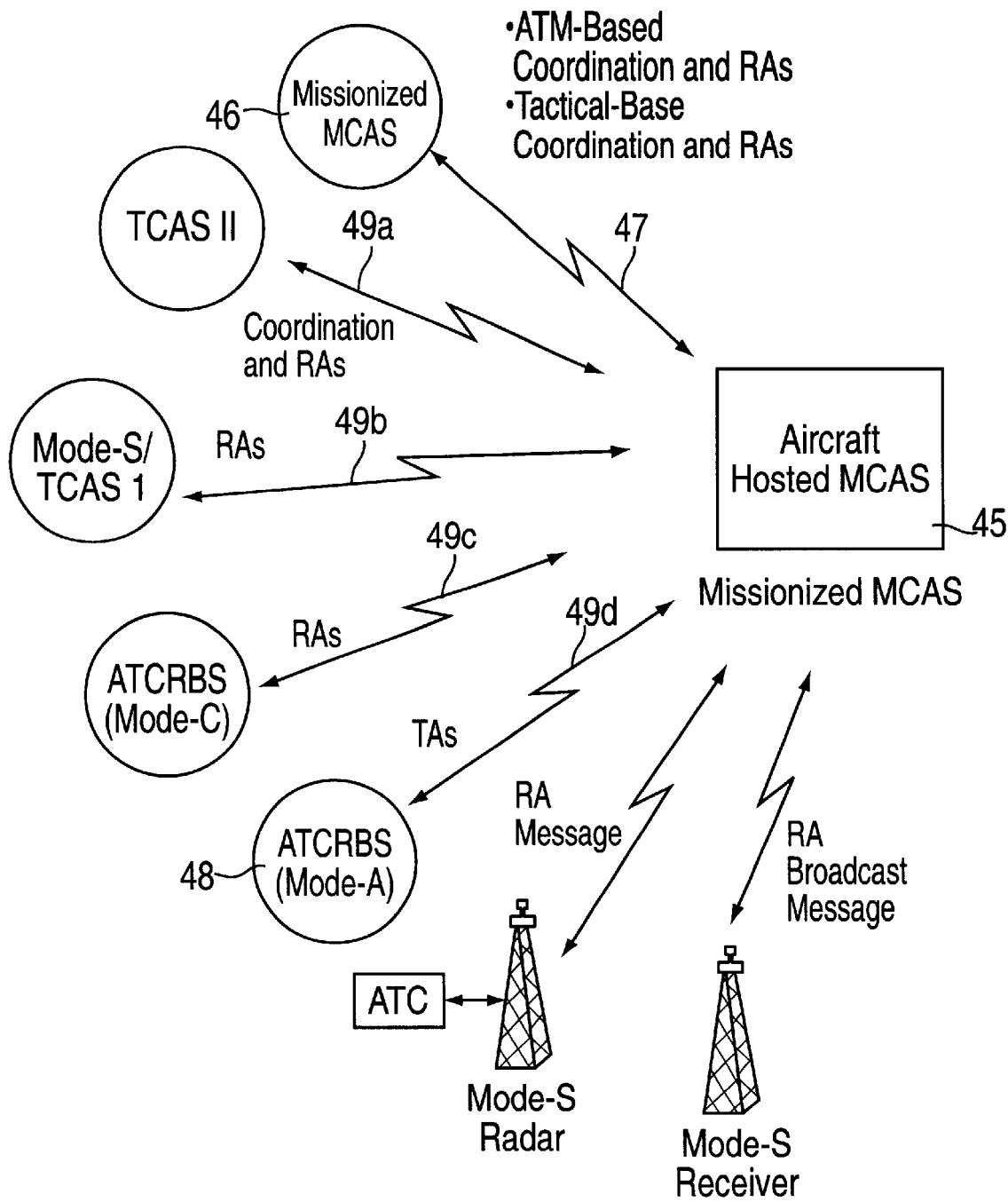
FIG. 3 is a block diagram of the air traffic advisory, collision avoidance resolution, and proximity mission flight capabilities of the MCAS in accordance with the present invention.

Referring to FIG. 3, there is shown various types of intruder equipment and the resulting advisories. With respect to the air collision avoidance capabilities, aircraft equipped with MCAS as shown in blocks 45 and 46 have extensive traffic advisory and air collision avoidance capabilities, that include ATM TAs and RAs, tactical caution/advisory/warning, and tactical avoidance solutions and resolutions 47. For example, the MCAS positioned as the wingman aircraft of a formation flight or in the refueller aircraft in an air refuelling mission will generate relative position deviation cues and velocity deviation cues for display systems 44 and control commands to the flight guidance system 46 in FIG.2. The MCAS 18 responds with various CAS capabilities depending on the capability of intruder aircraft 49a–d. It should be noted that Mode A only equipped intruders 48 will result in detection and display of TAs 49d only. An intruder not equipped with a transponder is essentially invisible to MCAS unless it has a digitized tactical data link.

Figure 4:
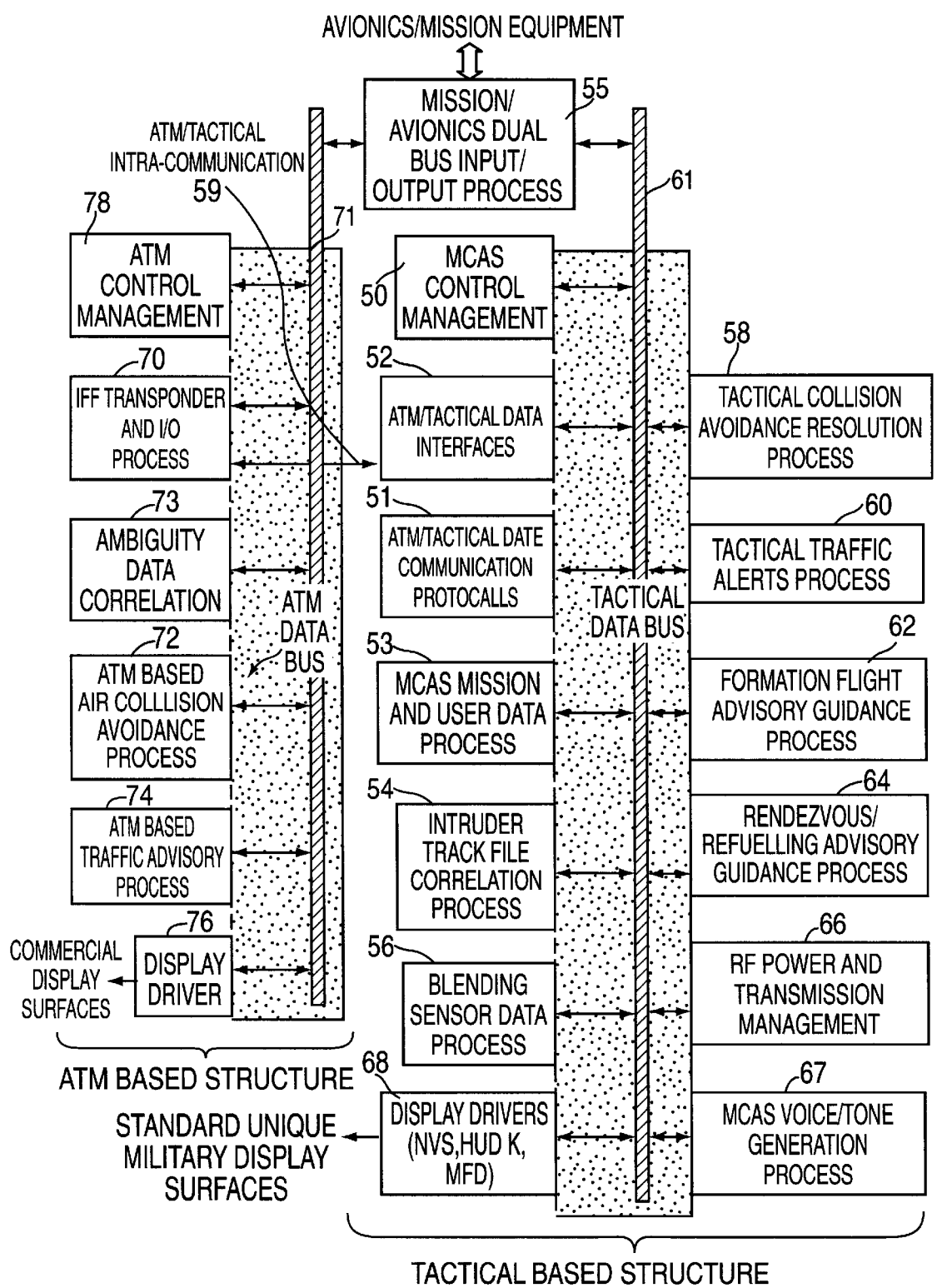
FIG. 4 is a block diagram of a midair collision avoidance system (MCAS) in accordance with one specific illustrative embodiment showing modular partition between the ATM module and the Tactical module, internal and external data communication, and the functional structure of the MCAS in accordance with the present invention.

Referring to FIG. 4, there is shown a more detailed block diagram of the MCAS 18 in FIG.2. Each module of the MCAS 18 contains a number of components, each of which provides a specific capability. While each of these components has dedicated functions, it will be recognized that, in each module, they continue to communicate with one another and share the information at all times. Communication between the MCAS and Avionics and Mission equipment onboard the aircraft is performed through mission and avionics dual bus input/output process 55. This process transmits, receives, and distributes MCAS related data to the two internal data bus, ATM data bus 71 and tactical data bus 61. For the ATM based module 20, the communication and data shared between its components is established through ATM data bus 71, a bus internal to this module 20. For the tactical based module 22, the communication and data shared between its components is established through tactical data bus 61, a bus internal to this module 22. Communication and data passing between the two MCAS modules 20 and 22 are accomplished through ATM/Tactical intra-communication bus 59. The real time data shared between the two modules 20 and 22, not only includes MCAS system mode, user-input data and selection, but also intruder track file data being processed, correlated, and maintained in each module. The shared intruder track file is used to resolve any ambiguities in terms of identifying an intruder aircraft as tactical, coordinated tactical, non-tactical (equipped with commercial TCAS) or unknown aircraft (detected by airborne radar system and by being not correlated in current track files).

Included within the ATM module 20 is ATM mode control management 78, IFF transponder and input/output process 70, ambiguity data correlation process 73, ATM based resolution advisory (RA) process 72, ATM based traffic advisory (TA) process 74, and display driver 76.

ATM mode control management process 78 coordinates data transmitting and receiving with the mode S/IFF transponder 32, computations necessary to determine traffic alerts and air collision avoidance conditions, intra-module communication, and track file correlations.

Ambiguity data correlation process 73 compares the following parameters: aircraft identification (ID), mission identification (MID), aircraft flight number, aircraft type, and aircraft position or relative position (distance, bearing, and pressure altitude) contained in each record of the intruder track file provided by IFF transponder with that provided by the Tactical module 22. This process identifies and tags intruder aircraft as a tactical aircraft if there is a match of at least two or more correlated parameters listed above. Resulting from the ambiguity data correlation process 73, the ATM module 20 processes ATM TAs and RAs for all aircraft that have not been tagged as tactical in the mixed mode. In the ATM mode, the information of a tactical aircraft is processed for TAs and RAs just like any non-tactical aircraft, and presented as a modified feature and color intruder symbol being overlaid the on traffic situation awareness display.

ATM based traffic advisory process 74 determines traffic advisories to indicate range, bearing, and relative altitude of the intruder to aid in visual acquisition of the intruder. In the ATM mode, the system tracks all aircraft in the surrounding airspace and generates traffic advisories (TAs) or resolution advisories (RAs), as the situation requires. Vertical guidance to avoid midair collision is accomplished by interrogating the Mode A, Mode C, and Mode S transponders of potential threat aircraft, tracking their responses, and providing advisories to the flight crew to assure vertical separation. Two levels of advisories are provided: 1) traffic advisories indicating range, bearing, and relative altitude of the intruder to aid in visual acquisition of the intruder; and 2) resolution advisories indicating what vertical maneuver needs to be performed or avoided in order to assure safe separation.

ATM-based MCAS functions will generate both RAs and TAs when the transponder is in Mode S operation. The two types of advisories correspond to predefined time-based protection zones around the aircraft. The airspace around the MCAS aircraft, where a RA is annunciated, represents the warning area; while the larger airspace, which results in a TA being annunciated represents the caution area. The warning area is an airspace around the host aircraft with 20 to 35 seconds closure time to collision. The caution area is an air space extended from the warning area by an additional 20 to 48 seconds.

ATM based in resolution advisory process 72 determines resolution for air collision conditions in advising the flight crew of a vertical maneuver to take or avoid.

In conjunction with pilot selection, the traffic information, traffic alerts, and air collision avoidance resolution, display driver 76 generate display images for local traffic situations and overlaid advisory text messages and symbols.

If the system mode is set to either a tactical mode or a mixed mode, then MCAS performs many processes embedded in the Tactical module 22 and these processes are described herein.

Included within the Tactical based MCAS functions' module 22 are MCAS control management 50, ATM and tactical data interface 52, tactical communication protocols 51, MCAS mission and user data process 53, intruder track file correlation process 54, blending sensor data process 56, display driver for display surfaces (e.g., NVS, MFD, and HUD) 68, tactical traffic alerts process 60, tactical collision avoidance resolution process 58, formation flight advisory and guidance process 62, rendezvous and air-refueling advisory and guidance process 64, RF power transmission management 66, and MCAS voice and tone generation process 67.

Figure 5:
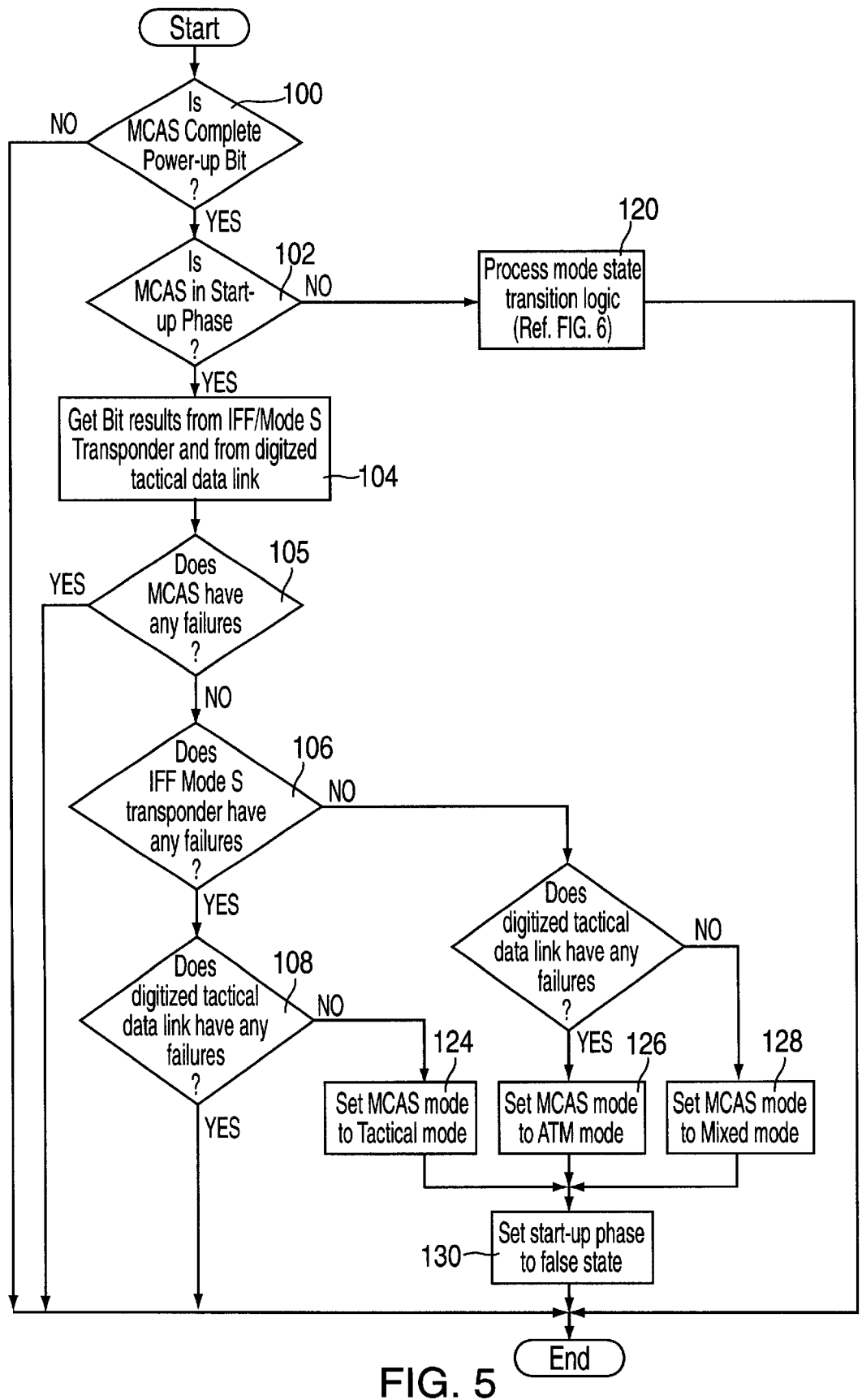
FIG. 5 is a logic flow diagram outlining the mode setting at initial system power-up and subsequent to power-up for the three system modes (ATM, tactical, or mixed) of operation of the MCAS system in accordance with the present invention.
Figure 6:
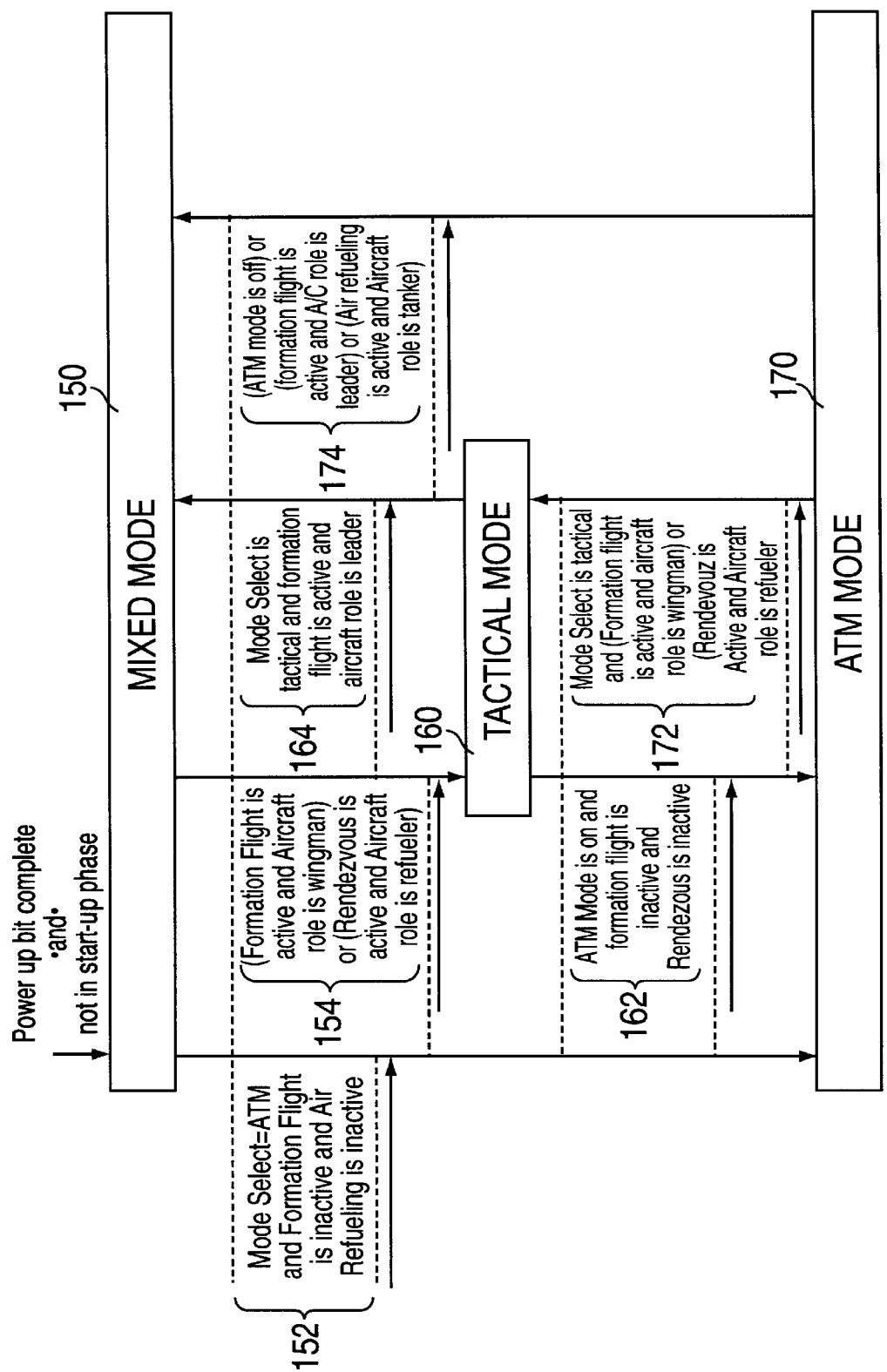
FIG. 6 is a mode transition diagram of the modes (ATM, tactical, or mixed) of operation of the MCAS system in accordance with the present invention.

MCAS control and management process 50 evaluates input data and pilot selections from control display unit (CDU), data transfer system (DTS), and MCAS control panel, along with the operational status of the various data link systems on board the aircraft to determine the active system mode. One of the three main system modes, ATM mode 126 (FIG. 5) and 170 (FIG. 6), Tactical mode 124 (FIG. 5) and 160 (FIG. 6), and Mixed mode 128 (FIG. 5) and 170 (FIG. 6), will be set active as shown in FIG. 5 and FIG. 6.

ATM and tactical data interface 52 (FIG. 4) provides handshakes with the IFF transponder and bus I/O process 70, and perform the functions of transmitting and receiving the shared data between two modules.

Tactical communication protocols 51 receives, processes, and distributes digital communication data, specifically, dynamic CAS related data, received by the physical link layer (e.g.; VHF/UHF, or Integrated Data Modem) connected with digitized tactical data link system 34. The process 51 collects and formats MCAS data into packets to provide to the digitized tactical data link for selectively broadcasting to other aircraft. In conjunction with Mode S data link, the digitized tactical data link 34 will not only be used to broaden the reception bandwidth for the MCAS related data, but also provide a reliable backup data link source, particularly, in a tactical environment that possibly includes jamming and radio frequency (RF) interference. Military digitized tactical data link capability for example, can be an important medium to pipe in mission and navigation data from other military aircraft, ships, and ground vehicles. Many important features provided by direct data link include secure data, robustness in terms of transmitting and requesting to retransmit, built-in error correction, and data compression from any of the used communication protocols. These include JPEG or any selected tri-service communication protocol. The frequency of transmit data link can be defaulted to a medium rate (6 Hertz) for the sole purpose of tactical collision avoidance, and can be increased to a higher rate (25 Hertz) in order to accommodate a tight formation flight and air-refueling operations. For instance, in a formation flight, tactical data link of the leader aircraft will be scheduled to transmit at a rate of 25 Hertz at a minimum power level to minimize long range detection. If a fighter aircraft operates at a tactical speed or in a dynamic maneuvering environment, then the data link will also need to be operated at a higher rate. For a rendezvous mission, when two aircraft are still far apart, the transmission can be set at a low rate, e.g., from 1 to 2 Hertz. The rate will switch to a higher rate as the tanker is approaching the rendezvous location.

A tactical data link packet would include of data regarding instantaneous host aircraft but not limited to aircraft position, source of navigation, datum, navigation accuracy index, pressure altitude, radar altitude, velocity vector, acceleration vector, flight phase/maneuvering sequence events, control and guidance mode, and control guidance target settings. Generally, all data is time tagged with a precise universal time provided by the Global Position System (GPS) segment. Although some of the navigation dynamic data will be overlapped with the data obtained from extended IFF Mode S transponder, the data provided by the tactical data link 34 serves as complementary and backup unit in the computations required for tactical collision avoidance solutions.

MCAS mission and user data process 53 pilot input data to the MCAS 18 can be entered into the MCAS 18 through various means that include MCAS control panel 30, control display unit 37, and data transfer system 38. The utility of the input data is to indicate mode selections to the system, activate specific mission capabilities, signal formation flight events, and report the progressive stage of a mission. The MCAS 18 evaluates this information to determine system mode. The input data to MCAS 18 can include, but not be limited to:

- selected operational mode—ATM, Tactical, or Mixed formation flight mode
- aircraft role in a formation flight—leader, sub-leader, or wingman
- specified vertical, longitudinal, and latitudinal offsets
- rendezvous mode
- aircraft role in a rendezvous/air-refueling—tanker or a re-fueller
- rendezvous position and time
- transitional event from rendezvous to air-refueling
- arm and disengage air refueling
- own aircraft identification (ID)
- identification of other interested aircraft
- mission identification (MID)
- aircraft data—latitude, longitude, altitude, airspeed for test mode
- display scales for 10, 20, 30, 60, 90-second radius Intruder track file correlation process 54 performs temporal intruder data based on time tagged with a precise universal time provided by the Global Position System (GPS) segment to provide a currency of intruder track file. It is important to note that since CAS data comes from many different sources (Mode S/IFF, digitized tactical data link, airborne radar, and etc.), it is necessary that this data be correlated in terms of mission ID, aircraft ID, or flight number. This is to ensure that the data coming from the same aircraft will be blended in the block 56 and used in processing collision avoidance solutions 58 and 60, formation flight control and guidance 62, air-refueling control guidance 64, and MCAS display drivers 68.

Blending sensor data process 56 uses a complementary filtering technique with some average weighting factors to combine the computed bearing and distance from the Mode S/IFF and, digitized tactical data link with the raw bearing and distance provided by the airborne radar 36 and station keeping equipment 37. This information is used in generating display images for traffic situation and selection of intruders in range for display.

The display driver (e.g., NVS, MFD, and HUD) 68 provides video, digital data, and digital image data to drive night vision system (NVS), multi-function display (MFD), and heads-up display (HUD) system while the display driver 76 in the ATM module 20 has the capability to drive a commercial vertical speed indicator and traffic-resolution advisory (VSI/TRA) color display unit and electronic flight instrument system (EFIS).

Figure 9:
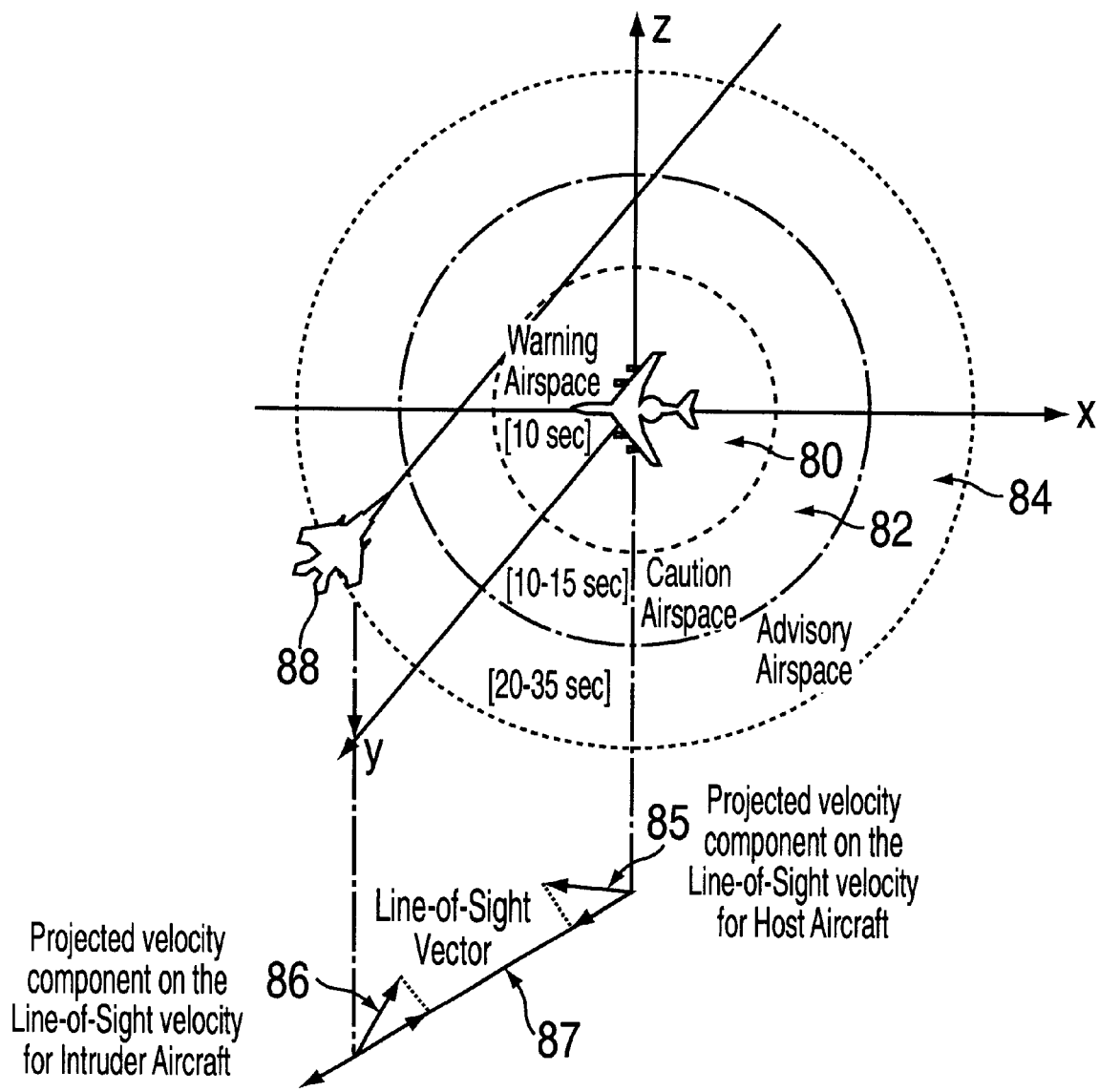
FIG. 9 is multi-dimensional space (proximity in closure time) of an exemplary time space region in which at least two aircraft are operating in accordance with the present invention.

Tactical traffic alerts process 60 uses the tactical model defined in FIG. 9 to determine if an intruder aircraft is in an advisory, caution, or warning situation and generate appropriate display messages, symbols, and audio to warn of the level of danger detected in an air proximity situation.

Figure 10:
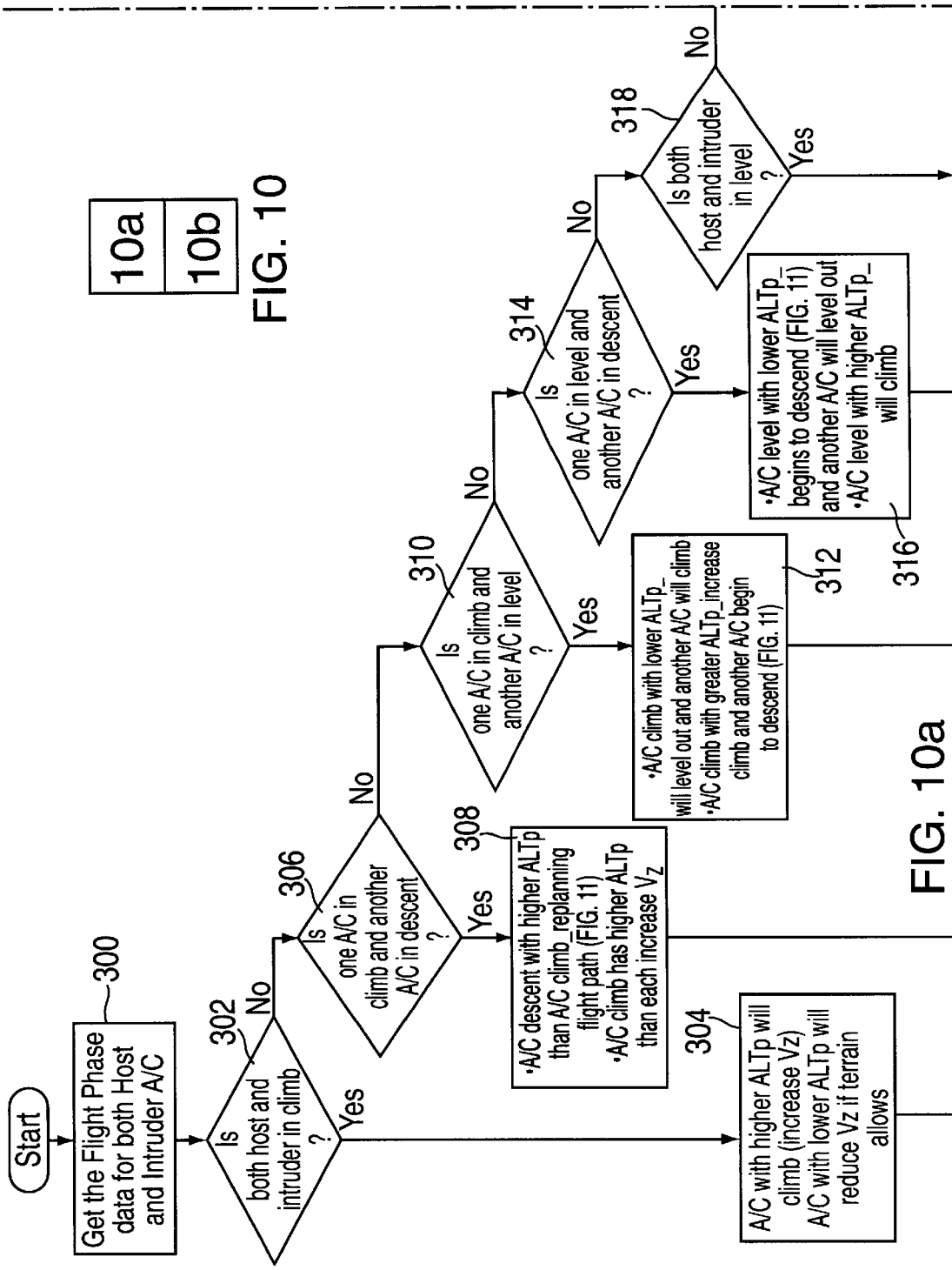
FIG. 10 is a logic flow diagram outlining a tactical collision avoidance resolution process followed by MCAS to generate appropriate collision avoidance maneuvering commands in accordance with the present invention.
Figure 10B:
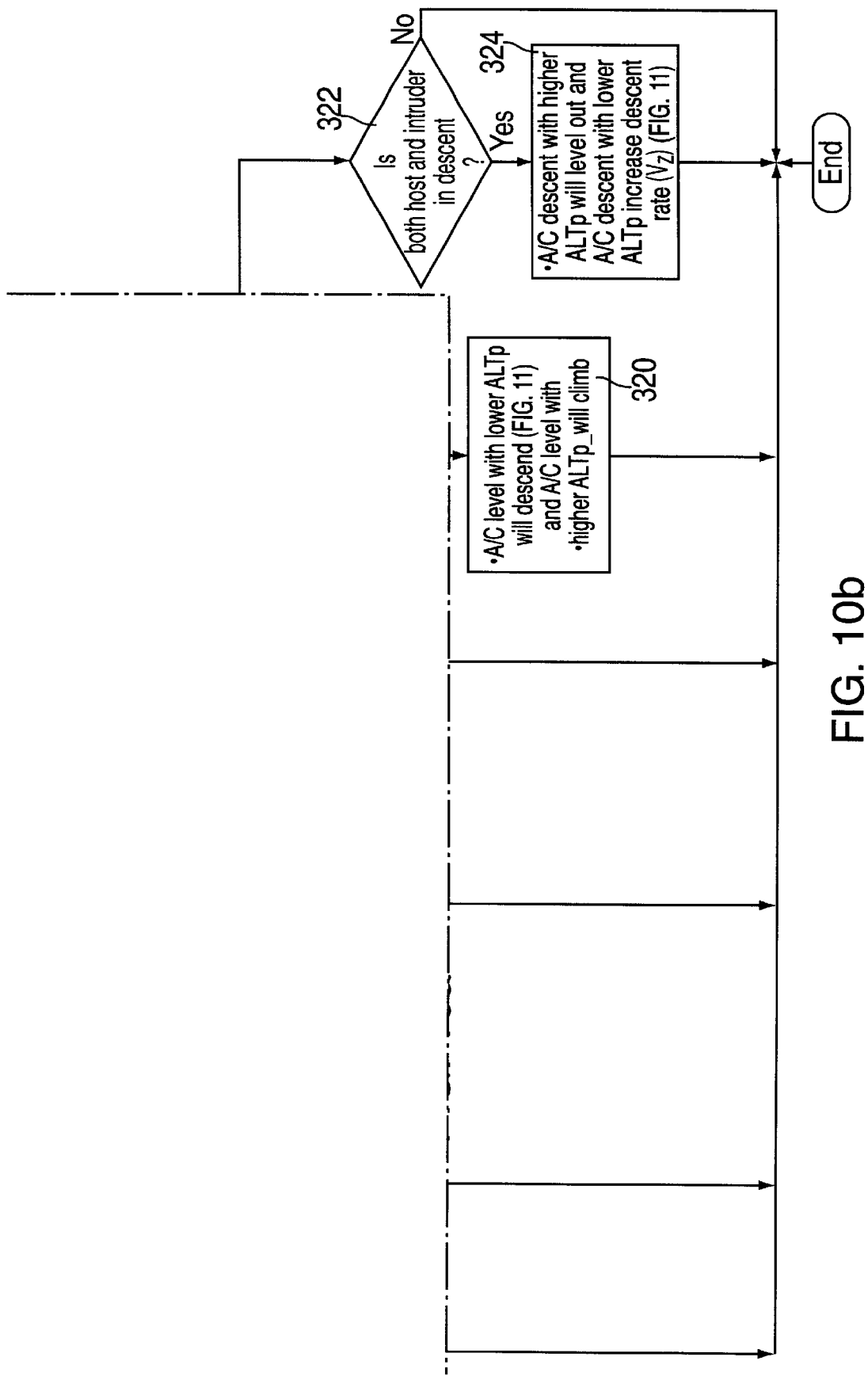
Figure 11:
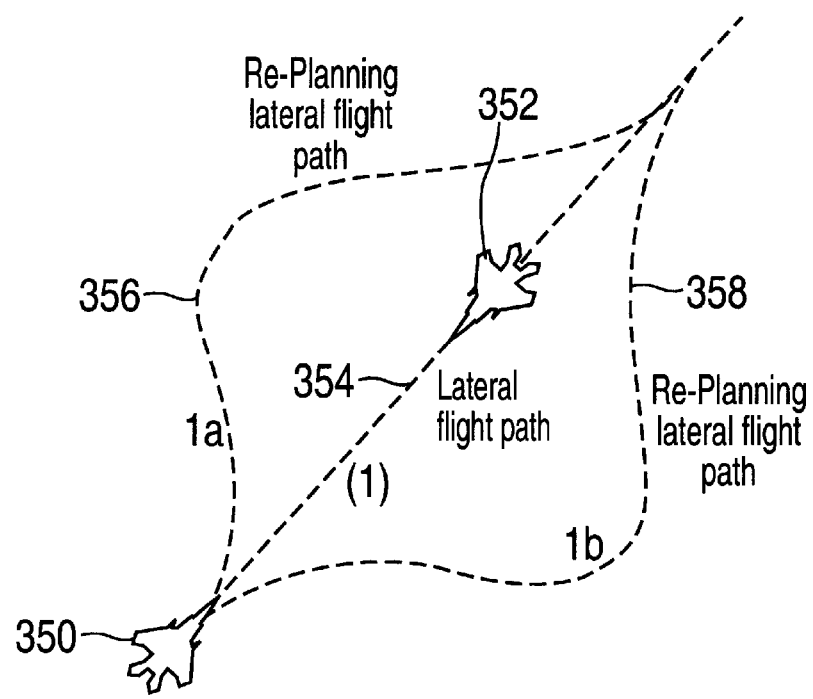
FIG. 11 is vertical scanning profile (elevation versus) of an exemplary geographical area illustrating the flightpath re-planning process in accordance with the present invention.
Figure 11:
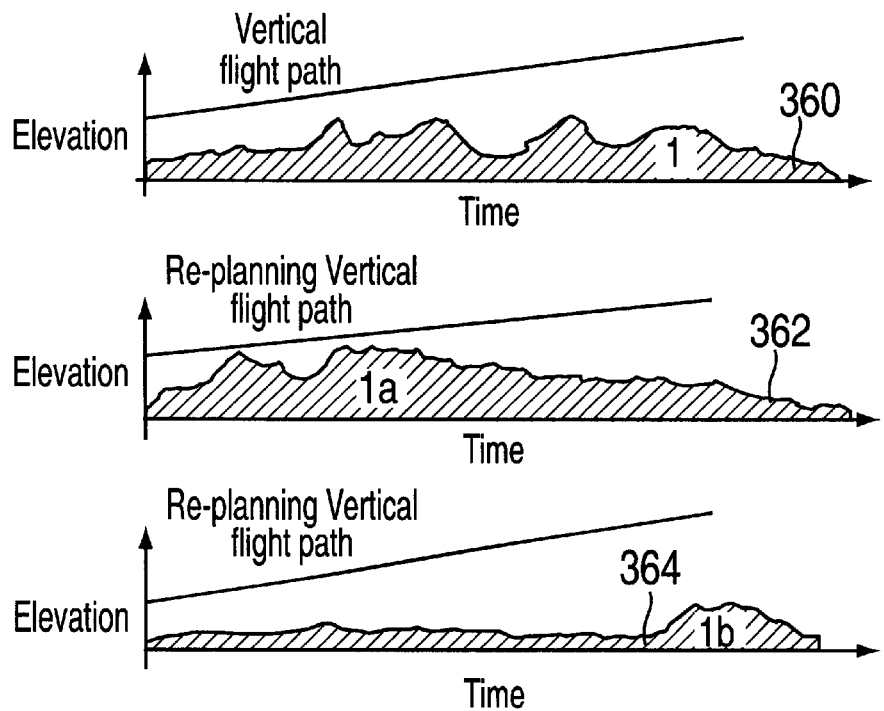

Tactical collision avoidance resolution process 58 evaluates the procedure that a host aircraft has to follow if the intruder aircraft is in caution air space and about to penetrate the warning (collision) air space. The process of selecting specific maneuvers and performing flight path re-planning will be a function of aircraft dynamics and the flight path characteristics of the intruder aircraft and the host aircraft as shown in FIG. 10 and FIG. 11.

Formation flight advisory and guidance process 62 continuously computes the desired wingman position based on the current position of the formation leader and the offset values. The process 62 then computes the lateral deviation, longitudinal deviation, vertical deviation, relative velocity, and relative acceleration. These parameters are input to the flight guidance control laws to generate roll commands, vertical speed commands, and thrust commands that are used to drive flight director cues and couple with a flight control system. If the aircraft is a formation leader or sub-leader, then any CAS advisories and resolutions that are currently active by direct (leader) or indirect (sub-leader) generation are made available to the wingmen, along with maneuvering events such as start-climb, start-descend, roll-in, roll-out, level-out, and etc. The process 62 determines all the maneuver events if the aircraft is a leader in a formation flight.

Rendezvous and air-refueling advisory and guidance process 64 computes the distance and estimated arrival time at a rendezvous position. This information is maintained and complemented with the contact data (data established through digital data link that provides information regarding the aircraft system parameters of the host aircraft). When the air-refueling phase becomes active, the process 64 performs similar computations as in process 62 to calculate guidance commands to maintain air re-fueling and relative docking, position and generate advisories if any deviations exceed thresholds.

RF power and transmission management 66 provides a capability to manage transmission power levels of RF radiating sources and the transmission rate for equipment operating in a particular RF spectrum. Referring again to FIG. 2, equipment in this group includes a Mode-S/IFF transponder 32, airborne radar 36, Station Keeping System (SKE) 36, and any tactical radios that might be used to support the digitized tactical data link 34. The system monitors pilot selection to control power setting levels for the equipment, and periodically schedules for transmitting data per request, requesting tactical/mission data, or just broadcasting. If the pilot selects to operate in a silent mode, then the system will inhibit all transmission activities, but will continue to operate in a passive mode by purely receiving data from the IFF extended Mode S and digitized tactical data link 34 to provide CAS solutions. MCAS voice and tone generation process 67 is based on priority setting for caution, advisory, and warning events to generate specific tone and voice messages associated with the event. The process 67 also monitors the removal of events or acknowledgment from the flight crew in order to distinguish tone and voice generation.

Referring to FIG. 5, there is shown a logic flow in determining the active mode for the MCAS 18, which is performed in MCAS control management 50. After system power-up, the first functions initiated are system initialization process and power-up built-in-test (PBIT). Due to time rate scheduling, the first check in the logic flow is determined if MCAS power-up BIT has been completed at step 100. If PBIT is still in progress, then the logic evaluation process is terminated in step 100. Otherwise, the next test is performed at step 102 to determine if this is very first time this logic has been evaluated since the PBIT is complete. To determine if one of the three system modes (ATM, tactical, or mixed) can be set to active, the system obtains internal BIT results, and BIT results from other equipment such as IFF Mode S transponder and digitized tactical data link at step 104. If MCAS has no critical failure at step 105, then the IFF Mode S transponder BIT results is evaluated at step 106. If there is no critical failure in the IFF mode S transponder, the system then tests for any critical failure in the digitized tactical data link in steps 122 and 108. If there is no failure in either the IFF mode S transponder and digitized tactical data link, then the mixed mode is set to active at step 128. If only the IFF mode S transponder is healthy, then the ATM mode is set to active at step 126. If only digitized tactical data link is active, then tactical mode is set to active at step 124. After setting one of the modes to active, MCAS control and management 50 sets start-up phase signal to a true state at step 130. With this signal being set, in the next frame time, the system follows the path to process mode transition logic defined in step 120 in order to evaluate system mode for subsequent to system start-up. The logic flow of step 120 is outlined in more detail in FIG. 6.

Referring to FIG. 6, there is shown a state transition diagram providing necessary logic to allow a transition from one system mode to another system mode. If the current system mode is the Mixed mode 150, then the system evaluates all logical conditions defined in blocks 152 and 154. If the conditions in block 152 are met, the system makes a transition from the Mixed mode 150 to the ATM mode 170. Otherwise, if the conditions in block 154 are met, then the system will make a transition from the Mixed mode 150 to the tactical mode 160. If the current mode is the tactical mode, then the system will evaluate logical conditions defined in blocks 162 and 164. If the conditions in block 162 are met, the system makes a transition from the tactical mode 160 to the ATM mode 170. If the conditions in block 164 are met mode, the system makes a transition from tactical mode 160 back to the Mixed mode 150. If the current mode is the ATM mode 170, then the system evaluates logical conditions defined in blocks 172 and 174. If the conditions in block 172 are met, the system makes a transition from the ATM mode 170 to the tactical mode 160. If the conditions in block 174 are met, the system makes a transition from ATM mode 170 back to the Mixed mode 150.

Figure 7:
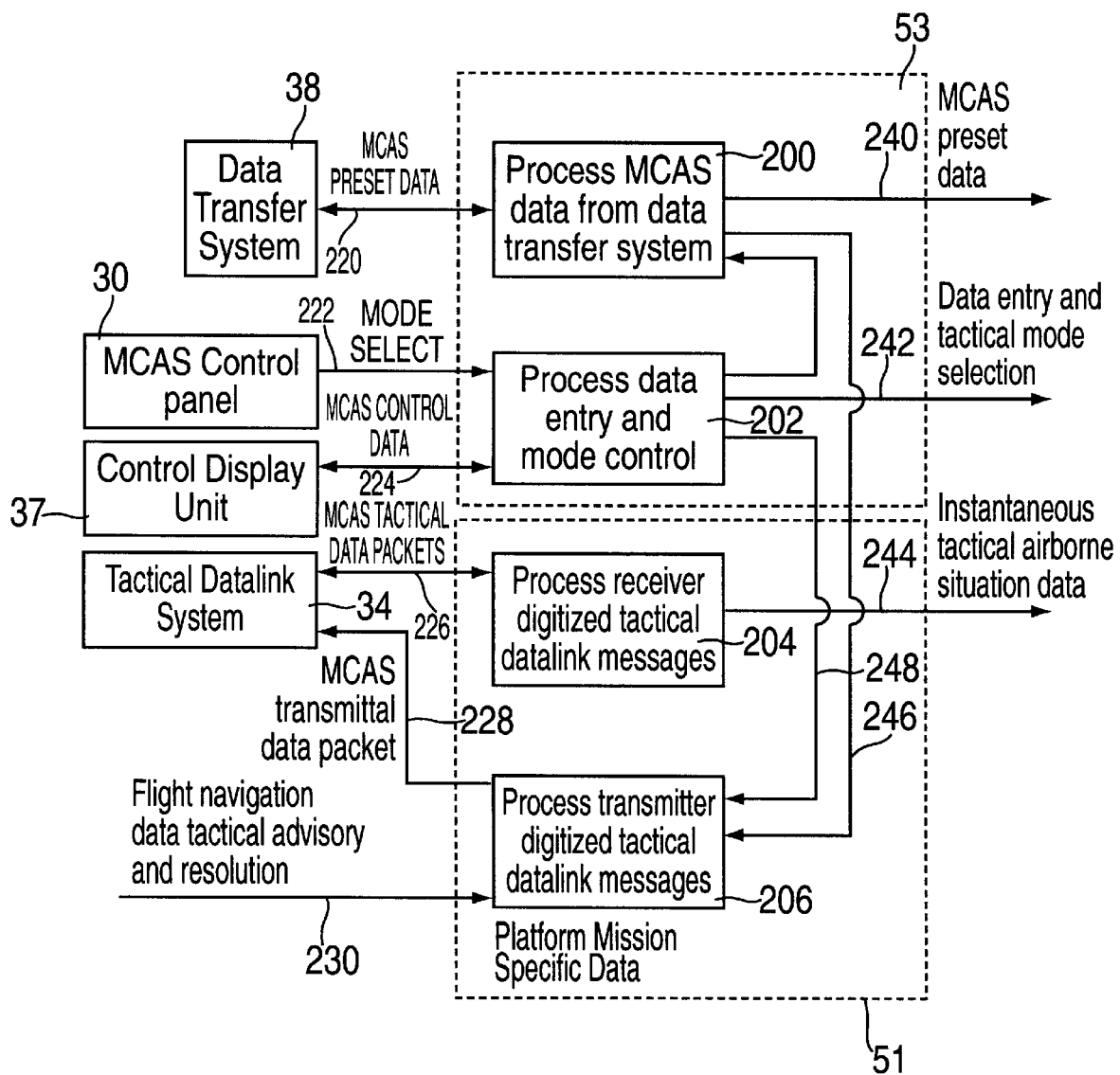
FIG. 7 is a block diagram outlining user interfaces and tactical communication protocols in accordance with the present invention.

Referring to FIG. 7, there is shown a block diagram to further illustrate the structure of MCAS mission and user data process 53 and tactical communication protocols 51. In order for the MCAS to operate with a full capability, MCAS obtains and processes data from a variety of external sources. Within the block 53, block 200 (process MCAS data from data transfer system) requests and down loads the mission related data (e.g., aircraft ID, mission ID, flight number, identification of other interested aircraft, rendezvous position and time, relative position offsets for formation flight, and etc.). Subsequently, if any of the listed parameters has been changed by manual data entry via the control display unit (CDU) 37, the process 53 provides utility to transmit/store the data back to the CDU. Outputs from this process 200 are MCAS preset data 240 for use by intruder track file correlation process 54 and platform/mission specific data 246 for use by process transmitter digitized tactical data link messages 206.

Figure 8:
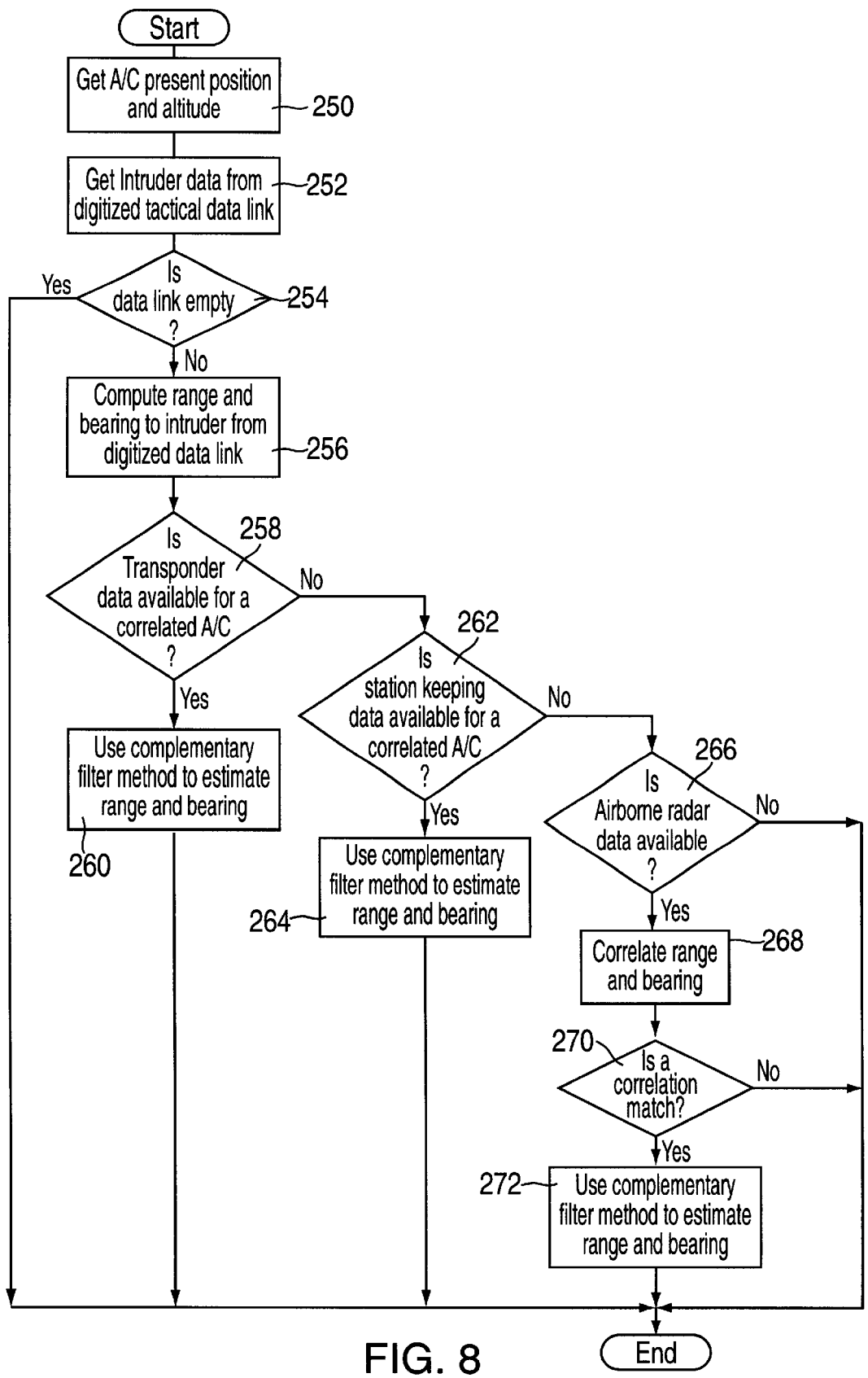
FIG. 8 is a logic flow diagram outlining the intruder track file correlation process and blending sensor data process in accordance with the present invention.

Referring to FIG. 8, there is shown a logic flow diagram to show the track file data correlation and the process of blending sensor data. The present invention provides a graceful degradation for all modes of operation. The system provides logic to select the best sensor data for CAS computations. The complementary data from Digitized Tactical Data Link 34, Airborne Radar 36, and Station Keeping Equipment (SKE) 36 is used to enhance the primary IFF Mode S/Transponder 32 data, fill any data gaps, or serves as back-up. The computed range and bearing data from the digitized tactical data 34 is combined with that of the IFF "Diversity" transponder whenever the data is available and valid. The blended information is used to determine if another aircraft is in the caution region, warning region, or about to penetrate the collision region. To perform this process, the system obtains the information of its own aircraft present position and present altitude in block 250. The information pertaining to the position and pressure altitude of each intruder aircraft is provided by digitized tactical data link system in block 252. The system ensures that each record of each intruder aircraft is processed in step 254. In block 256, range and bearing angles from the host aircraft relative to each intruder are computed. If the transponder also provides data for a correlated aircraft in step 258, then the system uses a complementary filter method to provide a better estimate of range and bearing values in step 260. Otherwise, the system checks to determine if the station keeping data for a correlated aircraft is available in step 262. If it is available, then the system uses a complementary filter method to provide an estimate of distance and bearing from the two sources of input data in step 264. If data are not available from IFF transponder and station keeping equipment, then another test is performed to determine if airborne radar data is available in step 266. If airborne data is available, then the range and bearing computed from digitized tactical data link will be correlated with the range and bearing data generated by the airborne radar system in step 268. If there is a match in the data correlation process, then the system uses a complementary filter method to provide an estimate of range and bearing from the two sources of digitized tactical data link and airborne radar in step 272.

Referring to FIG. 9, there is shown a multi-dimension tactical aircraft and collision model used to evaluate aircraft proximity in terms of closure range and closure rate to determine relative time space separation. In the mixed mode, MCAS 18 uses a different time-based dimension model than the ATM mode to track tactical aircraft and determine air traffic and collision avoidance situations. The tactical mode has three distinctive advisory, caution, and warning air spaces being equally distributed in three-dimensional space and time to increase situation awareness and probability of avoiding air collision. In addition, warning and caution air spaces are set with tighter time constraints than the ATM mode, that is not only to minimize nuisance warnings but to reflect the level of lethality of an air collision in a tactical environment.

In the Tactical mode, the MCAS 18 determines if the aircraft's current track being projected will intersect with the track of an intruder track. The MCAS 18 then monitors a time-based dimension model as illustrated in FIG. 9 with three CAS influence spheres (80, 82, 84). The inner sphere 80, which is defined as a highest probability of air collision—warning sphere, extends from the aircraft equipped with MCAS to an intruder aircraft within about 10 seconds before two aircraft converge to a collision point in midair. The middle sphere 82, which is defined as a medium probability of air collision—caution sphere, is extended with an additional 15 seconds time from the warning sphere. If an intruder penetrates the boundary of the warning sphere, an escape strategy in the form of a tactical avoidance resolution advisory (RA) such as evasive maneuvers guidance (climb, descend, climb and turn, or descend and turn) will be generated to guide the pilot. If required, the guidance command can be selected to couple with a flight control system. The RA is a vertical maneuver and/or a lateral maneuver based on vertical situation with respect to other aircraft in the proximity airspace and clearance of local terrain situation projected for maneuvering flight path as shown in FIG. 11. MCAS monitors a time-based dimension of an advisory sphere 84 that extends from 35 seconds up to 50 seconds from the time the intruder enters the MCAS aircraft's warning region 80. The closure time is calculated based on the line-of-sight distance from the reference aircraft to the intruder aircraft and the calculated closure rate if the closure rate is positive. If the calculated closure rate is close to zero, then the closure rate is set equal to a value of 5 Nautical Miles per hour to avoid any singularity in closure time computations. If the closure rate is a negative value, then the reference position (host aircraft) and the intruder are moving away from each other. The closure rate is the difference between the velocity vector of the host aircraft 85 and the velocity vector of the intruder aircraft 86 being projected on the line of sight vector 87. In the event that the velocity component is not available, then an estimated closure rate will be derived from the line of sight distance and its update rate through a moving average filter. If the aircraft is either a formation leader, a sub-leader or a tanker, then MCAS 18 will send ATM TAs and RAs and tactical TAs and RAs to wingmen (follower aircraft) and refueler aircraft for display and guidance control processing.

Referring to FIG. 10, there is shown a logic flow diagram for determining corrective maneuvers to avoid an air collision situation in a mixed mode operation. When the intruder aircraft is in a caution air space 82 as shown in FIG. 9, then the tactical collision avoidance resolution 58 begins to predict the necessary maneuvers for the host aircraft. The control and guidance for avoidance maneuvers are instantaneously provided to the pilot with flight director commands and flight control commands. This process reads the predicted flight phase data for both the host and intruder aircraft in step 300. A test to determine whether if both aircraft are in a climbing phase is performed in step 302. If both aircraft are in a climb phase, then block 304 will be processed. The aircraft with a higher-pressure altitude will increase vertical speed to an allowable level until the air collision condition is clear while the aircraft with a lower pressure altitude will reduce vertical speed if the terrain situation allows for it. If both aircraft are not in a climb phase, then the test 306 will determine if one aircraft is in a climb phase while another aircraft is in a descend phase. If the condition is met, then block 308 is processed. In block 308, if the aircraft in descent has a higher pressure-altitude, then flight path re-planning has to be performed as shown in FIG. 11. Otherwise, if the aircraft in climb has a higher-pressure altitude, then the absolute vertical speed from each aircraft will be increased. The next test 310 is to determine if one aircraft is in climb and another aircraft is in level flight. If the condition in 310 is met, block 312 will be processed. If the aircraft in climb has a lower pressure altitude than the aircraft is in level flight, then the aircraft in climb will have to level out and the aircraft in level flight will need to initiate a climb. If the aircraft in climb has a higher-pressure altitude than the aircraft in level flight, then the aircraft in climb will have to increase the climb rate until air collision condition is clear and the aircraft in level flight will initiate a descent if terrain is also clear. The next test 314 is to determine if one aircraft is in level flight while another aircraft is in descent. If the condition in 314 is met, block 316 will be processed. In this block 316, if the aircraft in level flight has a lower pressure altitude than the aircraft in descent, then the aircraft in level flight will have to initiate a descent if terrain situation is allowed and another aircraft will have to level out. The next test 318 is to determine if both aircraft are in level flight. If the condition in 318 is met, block 320 will be processed. In this block 320, the aircraft with a lower-pressure altitude will decend at a rate that can obtain terrain clearance and the aircraft with a higher-pressure altitude will initiate a climb. Both aircraft will return to their previous altitude when the air collision condition is no longer valid. The next test 322 is to determine if both aircraft are in decent. If the condition 318 is met, block 324 will be processed. In this block 324, the aircraft with a higher-pressure altitude will level out and another aircraft will increase its descent rate if local terrain situation is permitted.

Referring to FIG. 11, there is shown a flight situation where it is necessary to re-plan the current flight segment to avoid a mid air collision situation between the host aircraft 350 and an intruder aircraft 352. The system will process the situation with an initial right turn 358 and determine if the local terrain 362 that corresponds with this proposed flight path is clear from the proposed vertical path. If this flight path does not have a terrain clearance, then a symmetry path 356 will be evaluated for both air collision and terrain clearance 364. Different turn angles will be used to find the lateral path. When the air collision condition is no longer valid, the aircraft will change its maneuver to re-capture the original flight path.

Figure 12:
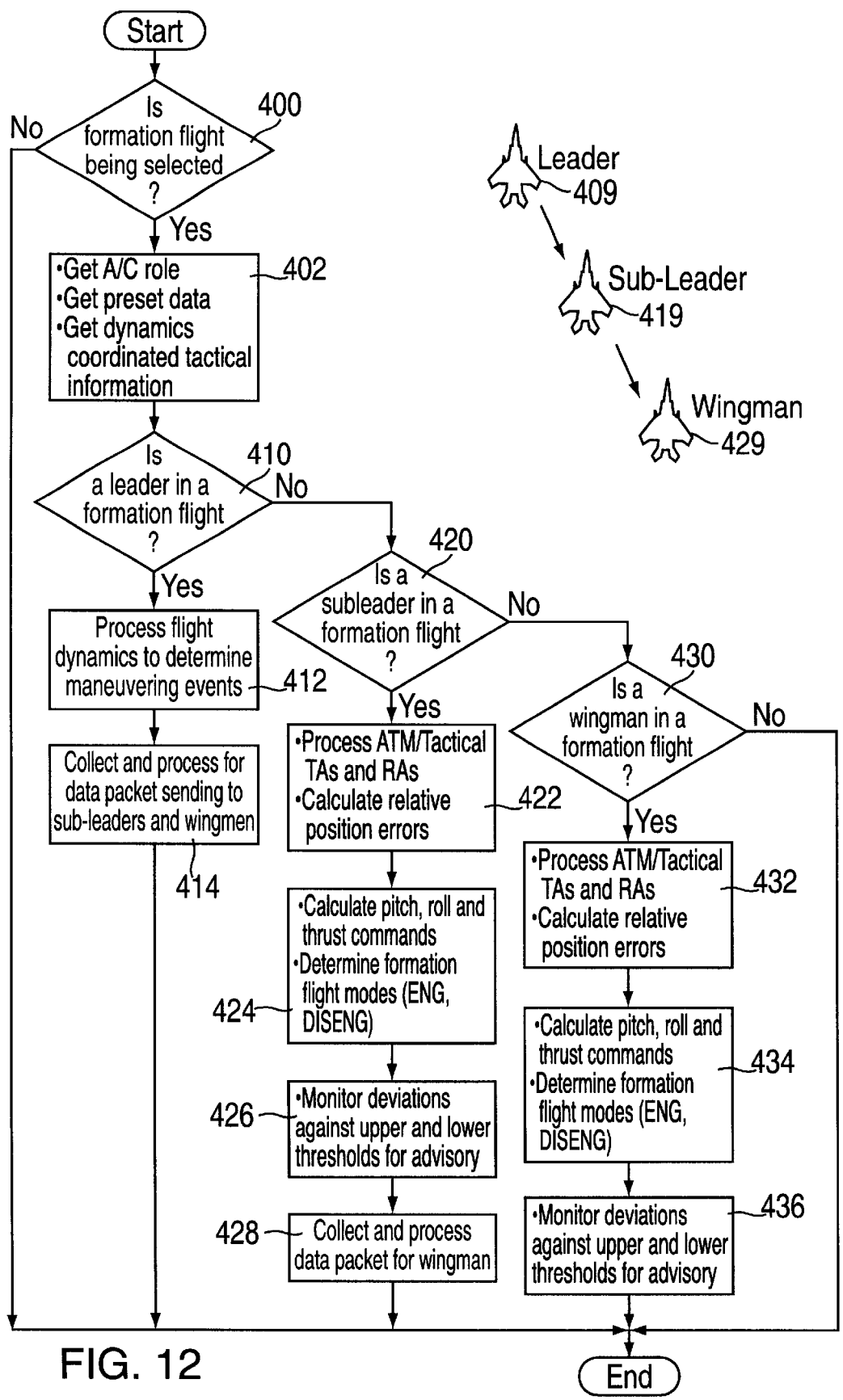
FIG. 12 is a logic flow diagram outlining a formation flight process that is followed by MCAS to provide formation flight commands in accordance with the present invention.

Referring to FIG. 12, there is shown a block diagram to provide logic and computations performed for each member in a formation flight. The first step 400 is to determine if the formation flight is active. If the formation flight is active, the system will process the information such as the role of the aircraft in a formation, preset data such as relative position offsets in x, y, and z axes, and dynamics coordinated tactical information in block 402. In step 410 a test is performed to determine if the aircraft is set as a main formation flight leader 409. If it is, then the system processes flight dynamics data to determine maneuvering events (e.g.; begin to turn, turn left, turn right, begin to climb, begin to descend, and etc.) to signal to the follower aircraft. In the next block 414, the system collects and formats data into packets that would be needed by the follower aircraft. In step 420, if the system determines that the aircraft is not a main leader but a sub-leader 419 in a formation flight 420, then the system will process the information associated with ATM/tactical traffic advisories and resolution advisories provided by the leader aircraft. In step 422, the system will use the navigation data from the host aircraft as well as the leader aircraft to determine relation position errors based on the preset relative offset values. With the computed relative position errors, the system feeds this information to the guidance control process to determine pitch, roll and thrust commands for error correction. In block 422, the system also determines whether to engage or disengage the formation flight mode. In block 426, the system monitors the position deviations against the upper as well as lower thresholds to trigger different formation flight advisories. The next block 428 is to collect and process formation flight data packet to transmit to the follower aircraft. If step 420 is a no, then the test 430 is to determine if the aircraft is a wingman 429. If it is, then block 432 is processed. The system processes the information related to ATM and tactical traffic advisories and collision resolution provided by the leader as a part of situation awareness display information. At the same time in step 432, the system in the wingman calculates relative position errors in order to feed this information to the guidance control process for generating pitch, roll and thrust correction commands and formation mode state in step 434. In this step, the system also monitors maneuvering command from the leader aircraft in order to compute delayed time and that will determine when the wingman should initiate a similar maneuver. In step 436, the system also compares the position deviations against specified thresholds to generate formation flight advisories such as: unable to keep up with the formation flight designation or exceeding lower threshold limits. As in the event of information flight break-away, the system will determine target roll angle command and target air speed to feed to the control guidance based on the aircraft relative position in a formation. An example for this is that the first right wingman will initiate a 30 degrees right hand turn and reduce 10 knots in airspeed and his follower wingman will initiate a 60 degrees right hand turn and reduce 20 knots in airspeed.

Figure 13:
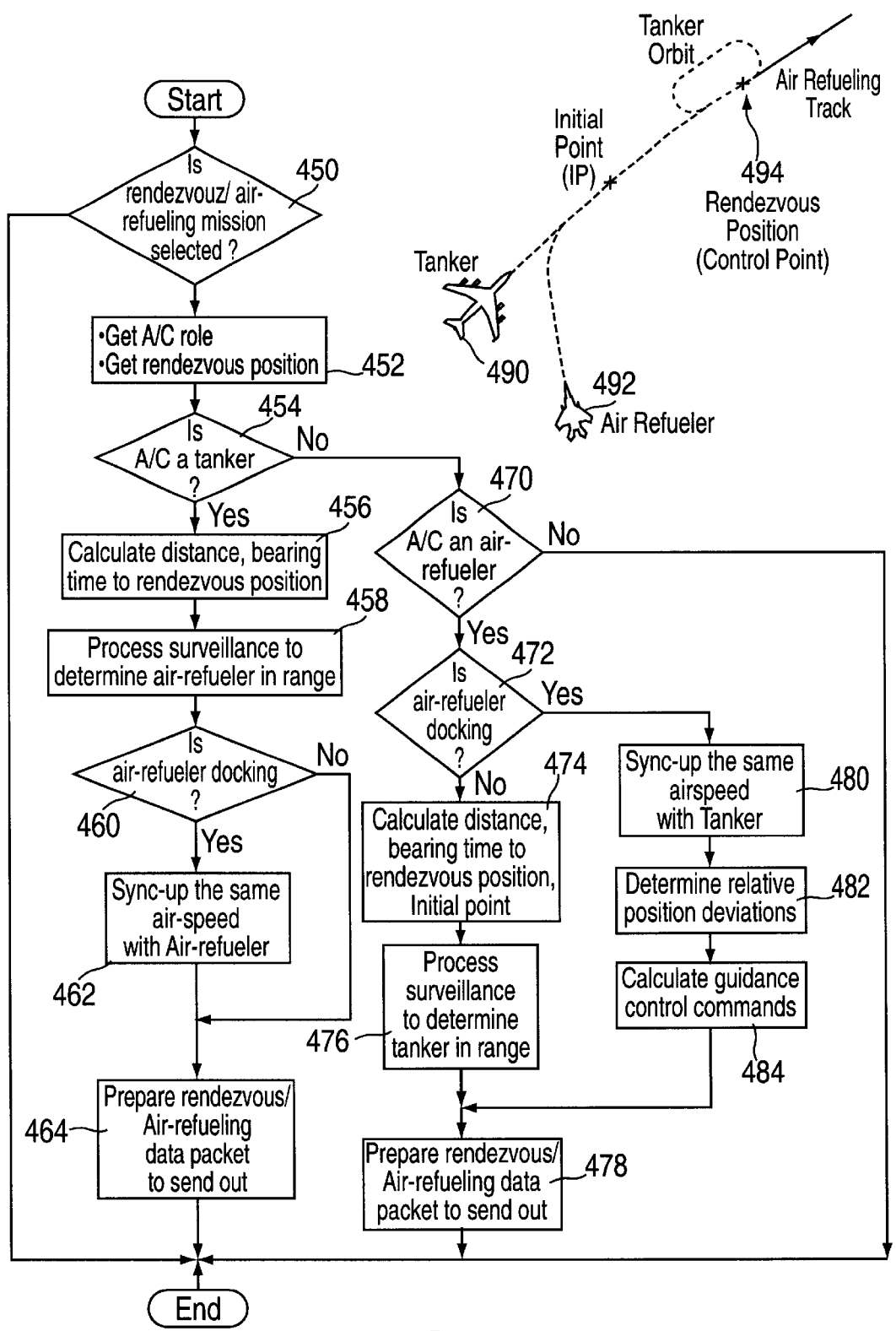
FIG. 13 is a logic flow diagram outlining a rendezvous and air refueling process followed by midair collision system to provide air-refueling commands in accordance with the present invention.

Referring to FIG. 13, there is shown a logic flow diagram illustrating the processing for tanker 490 and air re-fueler aircraft 492 in various phases of an air-refueling mission. The system can allow both the tanker and the refuellers to maintain precise situation awareness during all phases of the operation. The MCAS displays range, bearing, and relative altitude. These key parameters can be used to identify another aircraft or formation element relative location and hence improve the efficiency and mission times for in-flight rendezvous events. The advantage for rendezvous using digitized tactical data link is relative position, range, and arrival time can be displayed more accurately. Relative range and bearing will be calculated by MCAS based upon GPS position broadcasting by the Mode S transponder or received by digitized tactical data link system. When making close encounters with other aircraft for rendezvous purposes, the MCAS equipped aircraft will inhibit tactical traffic and resolution advisories and allow transition to an air-refueling mode to take place. The system checks to determine if rendezvous/air-refuelling mission is selected in step 450. If it is, the system obtains aircraft role in the mission along with the rendezvous position 494 in block 452. Next step 454 is to determine if the aircraft is a tanker. If it is, the system calculates distance, bearing angle and estimate time of arrival to the rendezvous position, which is the control point of the tanker orbit in step 456. The system also searches in the intruder track file for the air-refueller aircraft identification to determine if the air-refueller aircraft is within the contact range in step 458. The next test 460 is to determine if the air refueller aircraft is linked up to begin the refueling phase. If it is, the tanker aircraft control guidance syncs up with the air speed of the air-refueller aircraft in step 462. If it is not, the system prepares rendezvous and air refueling data packet for transmission in step 464. If the test in step 470 determines that the host aircraft is an air-refueller, then the system performs another test 472 to verify the aircraft is in docking phase. If the air-refueller is in docking phase, the system will command the control guidance to sync up with the tanker air speed in step 480. While in the re-fuelling phase, the system calculates relative position deviations in step 482 and feeds this information to control guidance to provide correction commands in step 484. If the air-refueller aircraft is not yet in docking phase, the system will compute distance, bearing angle and estimate time of arrival to the initial point (IP) and control point of tanker orbit in step 474. The system monitors based on surveillance to determine if the tanker is in range in step 476. The last step 478 is to prepare rendezvous and air re-fuelling data packet for transmitting.

Figure 14:
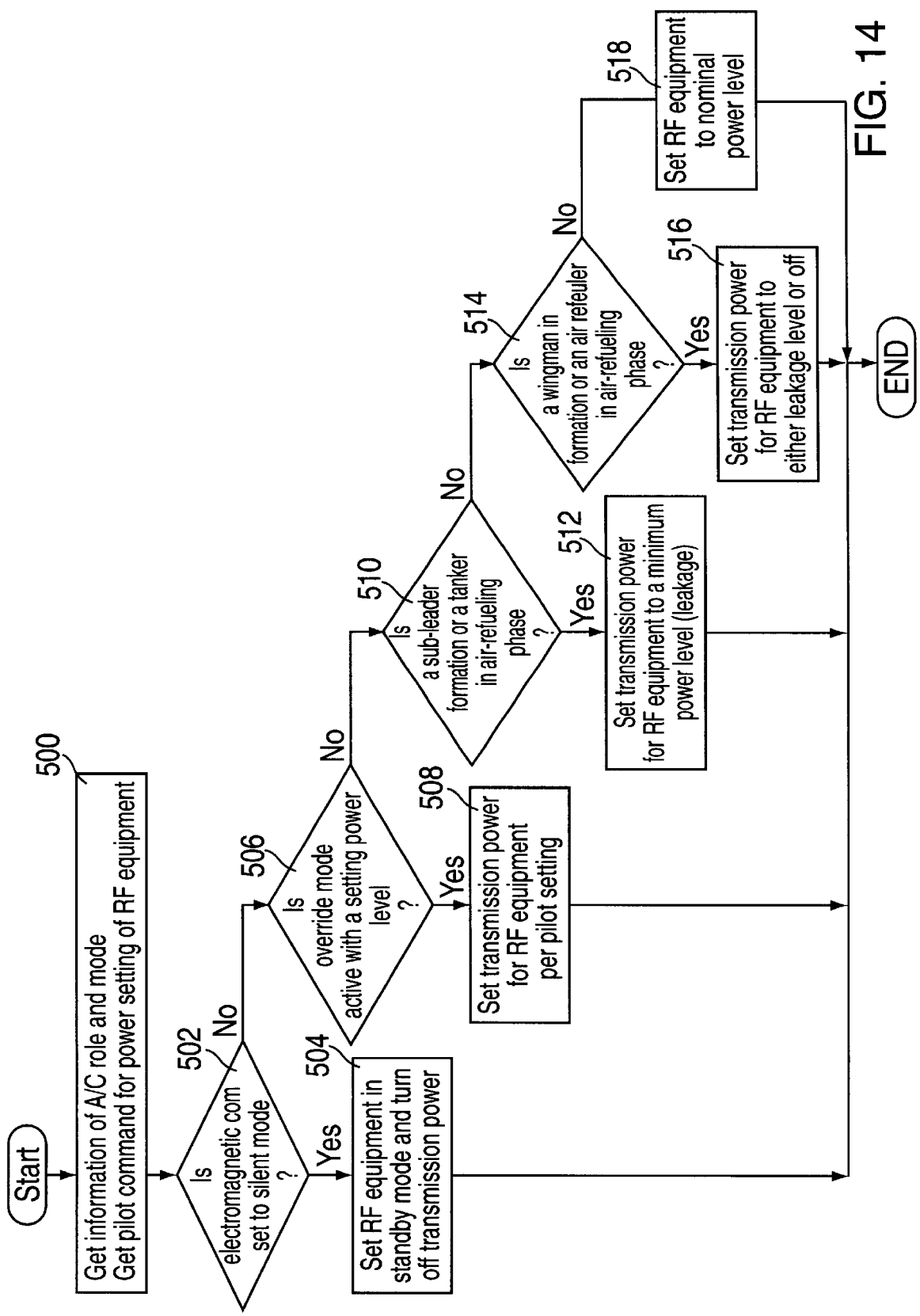
FIG. 14 is a block diagram outlining the Radio Frequency (RF) transmission power for the proximity flight mission of formation flight and air refueling in accordance with the present invention.

Referring to FIG. 14, there is shown a logic flow diagram which outlines logical conditions to determine appropriate power level required to be set for RF radiating sources. These sources include mode S/IFF transponder, tactical radios (e.g., ARC-201D, ARC-220, or any tactical VHF/UHF), station keeping equipment and airborne radar). The first step 500 in this functional module is to get information regarding aircraft role as well as pilot command for power setting for RF equipment. In step 502, if the electromagnetic communication mode is set to silent, then the system will set equipment to the standby mode and turn off transmission power in step 504. If the silent mode has not been set, then another test 506 is involved to determine if the override mode for power setting is active. If it is, the system sets transmission power for RF equipment per pilot setting in step 508. The next test 510 is to determine if the aircraft is a sub-leader in a formation flight or a tanker in re-fuelling phase. If test 510 is true, then the system set transmission power for RF equipment to lower power level or leakage level in step 512. If the test 514 determines that the aircraft is either a wingman aircraft or an air-refueller in refuelling phase, the system sets the transmission power for RF equipment to a leakage level in step 516. Otherwise, the system sets RF equipment to a nominal (medium) power level in step 518.

Figure 15A:
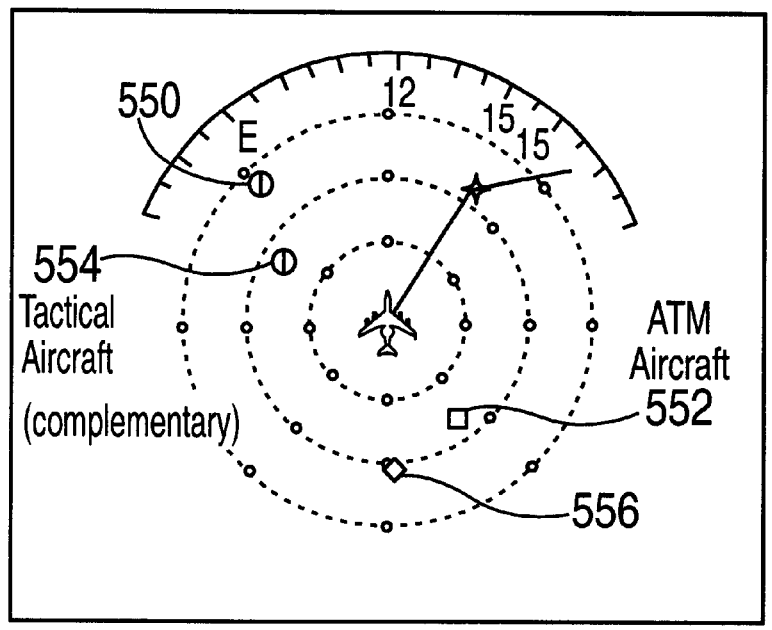
FIG. 15a is a display imagery frame illustrating an information presentation of tactical aircraft being complementary with ATM aircraft in an ATM mode in accordance with the present invention.

Referring to FIG. 15a, there is shown a display format of traffic and air collision situation in ATM mode with a complement of tactical aircraft 550 and 554 detected through digitized tactical data link medium and ATM aircraft 552 and 556 detected by the IFF Mode S transponder.

Figure 15B:
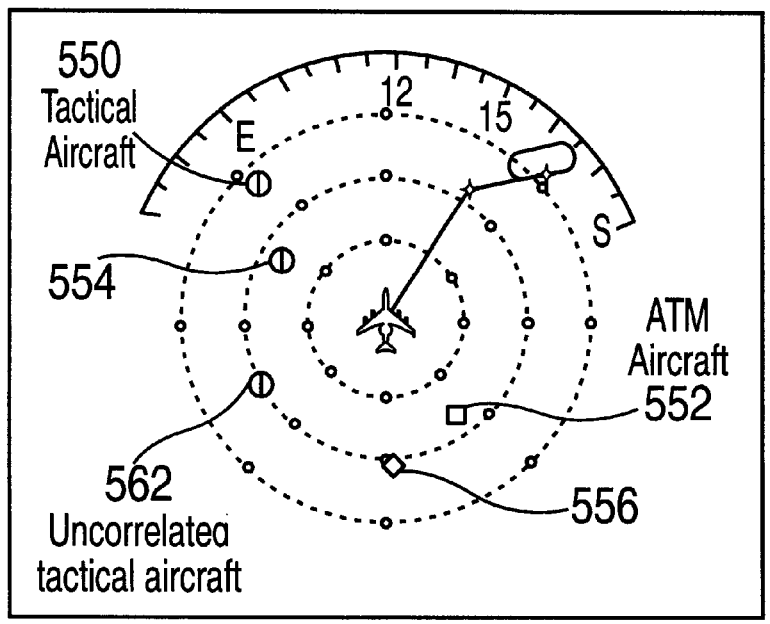
FIG. 15b is a display imagery frame illustrating a correlated traffic display while separating in a mixed mode in accordance with the present invention.

Referring to FIG. 15b, there is shown a display format of traffic and collision situation in a mixed mode. The information of air traffic and avoidance information generated from the airborne radar system and station keeping 562 is combined with the traffic information processed by the IFF transponder, such as 552 and 556, and the tactical digitized data link system, such as 550 and 554.

Figure 15C:
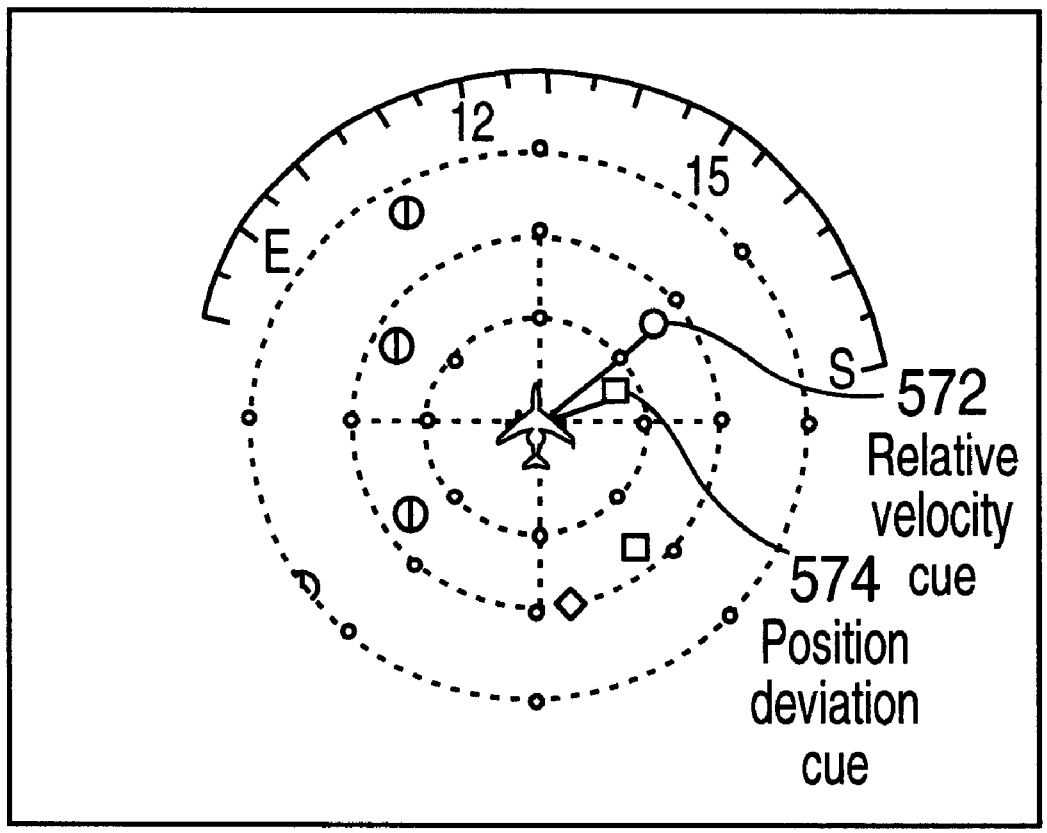
FIG. 15c is a display imagery frame illustrating information presentation for a formation flight wingman while operating in a tactical mode in accordance with the present invention.

Referring to FIG. 15c, there is shown a display format of tactical situation awareness provided by the formation leader being overlaid with the position error 574 and relative velocity 572 with respect to the formation leader aircraft.

Other variations and modifications of the present invention will be apparent to those of skill in the art, and it is the intent of the appended claims that such variations and modifications be covered. The particular values and configurations discussed above can be varied and are cited merely to illustrate a particular embodiment of the present invention and are not intended to limit the scope of the invention. For example, the antenna mounting technique taught in U.S. Pat. No. 5,805,111 could be implemented in the present invention to extend TCAS detection range. Further, the present invention further comprises a digital terrain elevation database that allows the TCAS to generate a vertical terrain profile, which results in a survivable control and guidance system. It is contemplated that the use of the present invention can involve components having different characteristics as long as the principle, the presentation of a TCAS with a tactical based module, is followed. The present invention applies to almost any CAS system and is not limited to use by TCAS. Additionally, although the present invention has been described with respect to aircraft operating a military tactical environment, it has application to aircraft operating in a civilian/commercial air space. It is intended that the scope of the present invention be defined by the claims appended hereto.

What is claimed is:

1. A midair collision avoidance system for use aboard an aircraft, the system comprising
    an air traffic management module for monitoring and tracking aircraft in the air traffic control environment external to the aircraft on which the system is located,
    a tactical based management module distinct from said air traffic management module, said tactical based management module for monitoring and tracking tactical aircraft in the tactical environment external to the aircraft on which the system is located, and an internal communication link between said air traffic management module and said tactical based management module.

2. The midair collision avoidance system in accordance with claim 1 wherein said tactical based management module includes means for providing essential control avoidance to maintain an aircraft in a formation flight or to carry out an air refueling mission.

3. The midair collision avoidance system in accordance with claim 1 further comprising an external dual bus system for linking said system with other equipment aboard the aircraft.

4. The midair collision avoidance system of claim 1 wherein said air traffic management module includes a first bus, said tactical based management module includes a second bus, and said internal communication link includes an interface connected to said first and second busses.

5. The midair alert and collision avoidance system in accordance with claim 1 wherein said tactical based management module includes an intruder track file correlation process.

6. The midair alert and collision avoidance system in accordance with claim 1 wherein said tactical based management module includes a tactical collision avoidance process.

7. The midair alert and collision avoidance system in accordance with claim 1 wherein said tactical based management module includes a formation flight advisory and guidance process.

8. The midair alert and collision avoidance system in accordance with claim 7 wherein said formation flight advisory process can be set dependent on the aircraft being a leader, a sub-leader, or a wingman.

9. The mid-air alert and collision avoidance system in accordance with claim 1 wherein said tactical based management module includes a rendezvous and air-refueling advisory and guidance process.

10. The midair alert and collision avoidance system in accordance with claim 9 wherein said air-refueling advisory and guidance process can be set depending on the aircraft's role in the refueling process.

11. The midair alert and collision avoidance system in accordance with claim 1 wherein said tactical based management module includes a communication process for generating audio signals representing advisory notices to the operator of the aircraft.

12. The midair alert and collision avoidance system in accordance with claim 11 wherein said audio signals represent advisory, caution, and warning notices indicative of distance approximations and closure rates.

13. The midair alert collision avoidance system in accordance with claim 4 wherein said tactical based management module includes an intruder track file correlation process, a tactical collision avoidance process, a formation flight advisory process, a rendezvous and air-refueling process, and a communication process, each of said processes being connected to said second bus.

14. The midair alert collision avoidance system in accordance with claim 13 wherein said tactical based management module further includes a control management process, an inter-module data link process, a tactical communication control process, a mission and user data process, a blending sensor data process, a tactical traffic alert process, a display drive process, and an external input and output process, all connected to said second bus.

15. The midair alert collision avoidance system in accordance with claim 1 wherein said system can be set to an air traffic management mode, a tactical based management mode, or a mixed mode.

16. The midair collision avoidance system in accordance with claim 15 wherein in the tactical mode the airspace around the aircraft is divided into an advisory, a caution, and a warning air space, said air spaces being equally distributed in three-dimensional space and time.

17. The midair collision avoidance system in accordance with claim 16 wherein said air traffic management module includes a tactical collision avoidance process activated when an intruder aircraft is crossing the boundary of said caution airspace.

18. The midair collision avoidance system in accordance with claim 16 wherein said tactical collision avoidance process continues to be activated when an intruder aircraft is penetrating into said warning airspace.

19. The midair collision avoidance system in accordance with claim 1 wherein said system can be set to one of a plurality of operational modes, including a formation flight mode and a rendezvous flight mode.

20. The midair collision avoidance system in accordance with claim 1 wherein said tactical based management module includes a radio frequency transmission power control process.

21. The midair collision avoidance system in accordance with claim 1 wherein said tactical based management module includes a tactical alert process capable of replanning to avoid midair collisions.

22. The midair collision avoidance system in accordance with claim 21 wherein said tactical alert process includes determination of altitudes above the ground terrain.

23. A midair alert and collision avoidance system comprising a plurality of data link transponders for generating and broadcasting data to a host airplane, and a traffic alert and collision avoidance system located on the airplane and including receivers in communication with said transponders, said traffic alert and collision system further comprising an air traffic management system for monitoring and tracking objects in the air traffic control environment external to the aircraft and a tactical based management system, in communication with said air traffic management system, for monitoring objects in the tactical environment external to the airplane.

24. The midair collision avoidance system in accordance with claim 23 further comprising a bus system for receiving data inputs from said receivers, said bus system being connected to said traffic alert and collision avoidance system.

25. The midair collision avoidance system in accordance with claim 23 wherein one of said transponders provides digital terrain elevation database to said bus systems whereby said system can generate vertical terrain profiles.

26. The midair collision and avoidance system in accordance with claim 23 further comprising a plurality of display devices and wherein said air traffic management system includes a first bus and said tactical based management system includes a second bus, one of said display devices being connected to each of said first and second busses.

* * * * *